(12) United States Patent
Ooi et al.

(10) Patent No.: US 6,925,262 B2
(45) Date of Patent: Aug. 2, 2005

(54) METHOD AND SYSTEM FOR COMPENSATING CHROMATIC DISPERSION

(75) Inventors: Hiroki Ooi, Kawasaki (JP); George Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 643 days.

(21) Appl. No.: 09/822,466

(22) Filed: Apr. 2, 2001

(65) Prior Publication Data

US 2002/0015207 A1 Feb. 7, 2002

(30) Foreign Application Priority Data

Aug. 7, 2000 (JP) ........................................ 2000-238349

(51) Int. Cl.[7] ............................................. H04B 10/12
(52) U.S. Cl. ........................ 398/147; 398/29; 398/159
(58) Field of Search ............................. 398/43, 48, 81, 398/140–144, 147, 148, 158, 159, 173, 177, 182, 192–194, 200–204, 208, 214, 149, 150, 29; 359/337.5, 339, 337.1–337.22, 349

(56) References Cited

U.S. PATENT DOCUMENTS

| | | | | |
|---|---|---|---|---|
| 5,602,666 A | * | 2/1997 | Ishikawa et al. | 398/159 |
| 5,717,510 A | | 2/1998 | Ishikawa et al. | 398/199 |
| 5,877,879 A | * | 3/1999 | Naito | 398/91 |
| 5,930,414 A | * | 7/1999 | Fishman et al. | 385/11 |
| 5,973,816 A | | 10/1999 | Akiyama et al. | 359/237 |
| 5,999,289 A | * | 12/1999 | Ihara et al. | 398/147 |
| 6,081,360 A | | 6/2000 | Ishikawa et al. | 398/147 |
| 6,271,945 B1 | * | 8/2001 | Terahara | 398/26 |
| 6,317,240 B1 | * | 11/2001 | Penninckx et al. | 398/147 |
| 6,370,300 B1 | * | 4/2002 | Eggleton et al. | 385/37 |
| 6,509,993 B1 | * | 1/2003 | Gnauck et al. | 398/194 |
| 6,522,821 B1 | * | 2/2003 | Hirano et al. | 385/127 |
| 6,567,577 B2 | * | 5/2003 | Abbott et al. | 385/24 |
| 6,583,907 B1 | * | 6/2003 | Essiambre | 398/158 |
| 6,594,428 B1 | * | 7/2003 | Tanaka et al. | 385/123 |
| 6,611,637 B1 | * | 8/2003 | Okuno et al. | 385/24 |
| 6,661,973 B1 | * | 12/2003 | Huber et al. | 398/91 |
| 2002/0006257 A1 | * | 1/2002 | Danziger | 385/123 |

FOREIGN PATENT DOCUMENTS

| | | |
|---|---|---|
| JP | 11-68657 | 3/1999 |
| JP | 11-088260 | 3/1999 |
| JP | WO99/28723 | 6/1999 |
| JP | 11-346191 | 12/1999 |

* cited by examiner

*Primary Examiner*—Jason Chan
*Assistant Examiner*—Christina Y Leung
(74) *Attorney, Agent, or Firm*—Staas & Halsey LLP

(57) ABSTRACT

Disclosed herein are a method and system for compensating chromatic dispersion. The method includes the steps of generating WDM signal light by wavelength division multiplexing a plurality of optical signals having different wavelengths, transmitting the WDM signal light by an optical fiber transmission line, and receiving the WDM signal light transmitted by the optical fiber transmission line. The receiving step includes the steps of detecting chromatic dispersion related to at least one of the plural optical signals, and providing a variable dispersion compensator whose chromatic dispersion and dispersion slope are controlled so that the detected chromatic dispersion is reduced. According to this method, waveform degradation due to dispersion can be compensated with high accuracy in consideration of dispersion and dispersion slope.

21 Claims, 32 Drawing Sheets

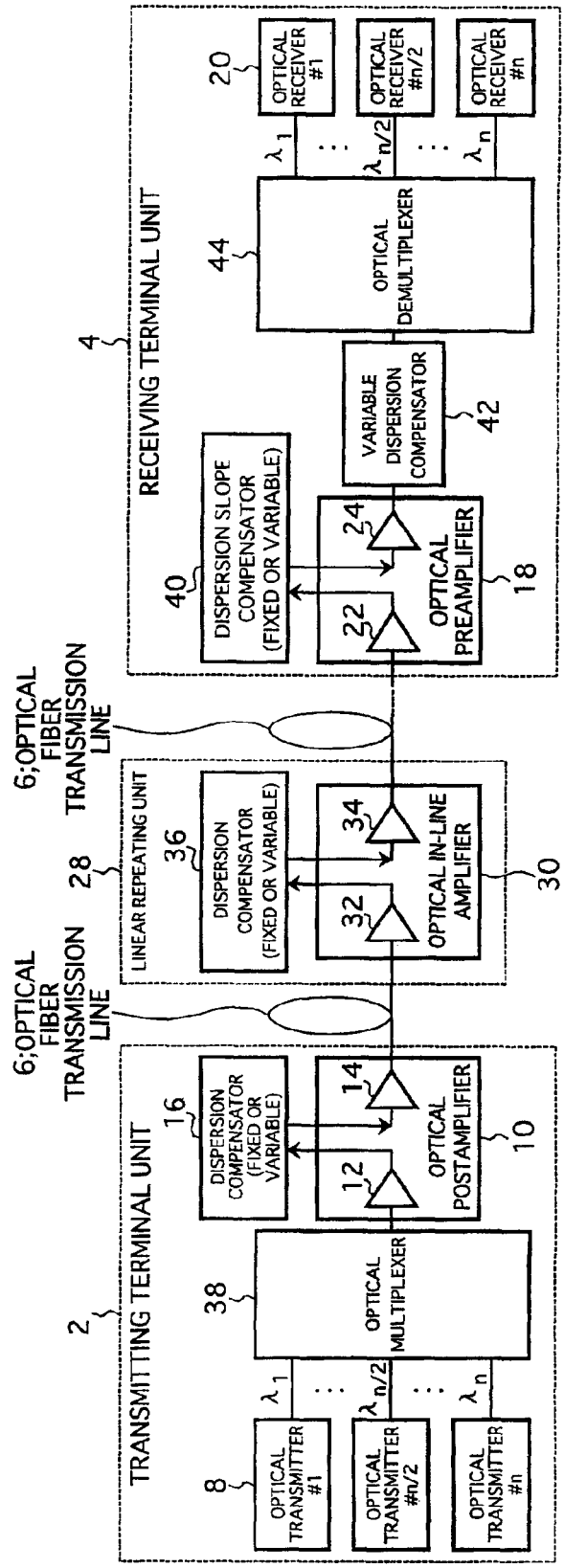
F I G. 4

F I G. 9
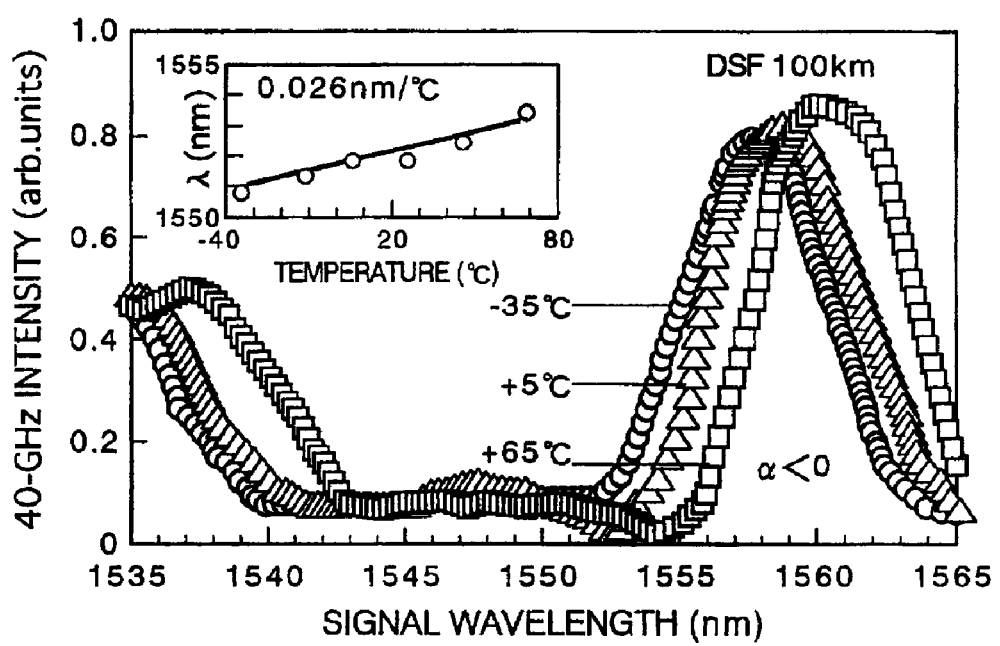

METHOD AND SYSTEM FOR COMPENSATING CHROMATIC DISPERSION

BACKGROUND OF THE INVENTION

1. Field of the Invention

The present invention relates to a method and system for compensating chromatic dispersion.

2. Description of the Related Art

With a recent increase in the use of a network, a higher capacity is increasingly demanded to the network. At present, a wavelength division multiplexing (WDM) optical transmission system at a bit rate of 10 Gb/s per channel as a base transmission speed is in practical use. It is expected that a higher transmission capacity will become necessary in the future, so that an ultra high-speed transmission system at a bit rate of 40 Gb/s or higher per channel is desired from the viewpoints of frequency efficiency and cost. In such an ultrafast transmission system, waveform degradation due to chromatic dispersion of an optical fiber transmission line must be compensated with high accuracy. The present invention is a technique for optimally performing chromatic dispersion compensation in a WDM optical transmission system.

In an optical transmission system at a bit rate of 10 Gb/s or higher, a chromatic dispersion tolerance is very small. For example, the chromatic dispersion tolerance in a 40-Gb/s NRZ system is 100 ps/nm or less. In the case of a terrestrial transmission system, a repeater spacing is not always constant. For example, in the case of using a 1.3 $\mu$m zero-dispersion single-mode fiber (SMF) having a dispersion of about 17 ps/nm/km, the dispersion deviates from the chromatic dispersion tolerance with only a difference of several kilometers in transmission distance.

However, in an optical fiber network owned by a communication carrier, the distance and chromatic dispersion of each repeater spacing are not accurately grasped in the present circumstances. Further, because the chromatic dispersion changes with time according to the temperature, stress, etc. of a fiber, the chromatic dispersion must be accurately measured not only at starting the operation of the system but also during the operation of the system, and the amount of compensation for the dispersion in each repeater spacing must be properly controlled. For example, in the case that a temperature change of 100° C. occurs in a 500-km transmission line using a dispersion shifted fiber (DSF), a chromatic dispersion change becomes about 105 ps/nm as shown below, which value is nearly equal to the chromatic dispersion tolerance of a 40-Gb/s NRZ signal.

(chromatic dispersion change)=(temperature dependence of zero-dispersion wavelength)×(temperature change of the transmission line)×(dispersion slope of the transmission line)×(transmission distance)=(0.03 (nm/° C.)×100 (° C.)× 0.07 (ps/nm$^2$/km)×500 (km)=105 ps/nm.

Further, as described later in detail, it is necessary to consider not only chromatic dispersion but also dispersion slope (dispersion tilt or second-order dispersion) in a WDM optical transmission system. This is due to the fact that a plurality of optical signals having different wavelengths are wavelength division multiplexed in a WDM optical transmission system and that chromatic dispersion related to one of the plural optical signals is different from that related to another.

SUMMARY OF THE INVENTION

It is therefore an object of the present invention to provide a chromatic dispersion compensating method and system suitable for faster operation in a WDM optical transmission system.

In accordance with a first aspect of the present invention, there is provided a method comprising the steps of generating WDM signal light by wavelength division multiplexing a plurality of optical signals having different wavelengths; transmitting the WDM signal light by an optical fiber transmission line; and receiving the WDM signal light transmitted by the optical fiber transmission line; the receiving step comprising the steps of detecting chromatic dispersion related to at least one of the plurality of optical signals; and providing a variable dispersion compensator whose chromatic dispersion and dispersion slope are controlled so that the detected chromatic dispersion is reduced.

In accordance with a second aspect of the present invention, there is provided a method comprising the steps of generating WDM signal light by wavelength division multiplexing a plurality of optical signals having different wavelengths; transmitting the WDM signal light by an optical fiber transmission line; and receiving the WDM signal light transmitted by the optical fiber transmission line; the receiving step comprising the steps of detecting chromatic dispersion related to at least one of the plurality of optical signals; providing a variable dispersion compensator whose chromatic dispersion is controlled so that the detected chromatic dispersion is reduced; and providing a dispersion slope compensator for compensating dispersion slope.

In accordance with a third aspect of the present invention, there is provided a system comprising a transmitting terminal unit for generating WDM signal light by wavelength division multiplexing a plurality of optical signals having different wavelengths; an optical fiber transmission line for transmitting the WDM signal light; and a receiving terminal unit for receiving the WDM signal light transmitted by the optical fiber transmission line; the receiving terminal unit comprising a dispersion monitor for detecting chromatic dispersion related to at least one of the plurality of optical signals; a variable dispersion compensator; and a circuit for controlling the chromatic dispersion and dispersion slope in the variable dispersion compensator so that the detected chromatic dispersion is reduced.

In accordance with a fourth aspect of the present invention, there is provided a system comprising a transmitting terminal unit for generating WDM signal light by wavelength division multiplexing a plurality of optical signals having different wavelengths; an optical fiber transmission line for transmitting the WDM signal light; and a receiving terminal unit for receiving the WDM signal light transmitted by the optical fiber transmission line; the receiving terminal unit comprising a dispersion monitor for detecting chromatic dispersion related to at least one of the plurality of optical signals; a variable dispersion compensator; a circuit for controlling the chromatic dispersion in the variable dispersion compensator so that the detected chromatic dispersion is reduced; and a dispersion slope compensator for compensating dispersion slope.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 4 is a block diagram showing a fourth preferred embodiment of the system;

FIG. 9 is a graph of experimental results for illustrating the operation principle of the dispersion monitor;

DETAILED DESCRIPTION OF THE PREFERRED EMBODIMENTS

Some preferred embodiments of the present invention will now be described in detail with reference to the attached drawings.

Figure 1:
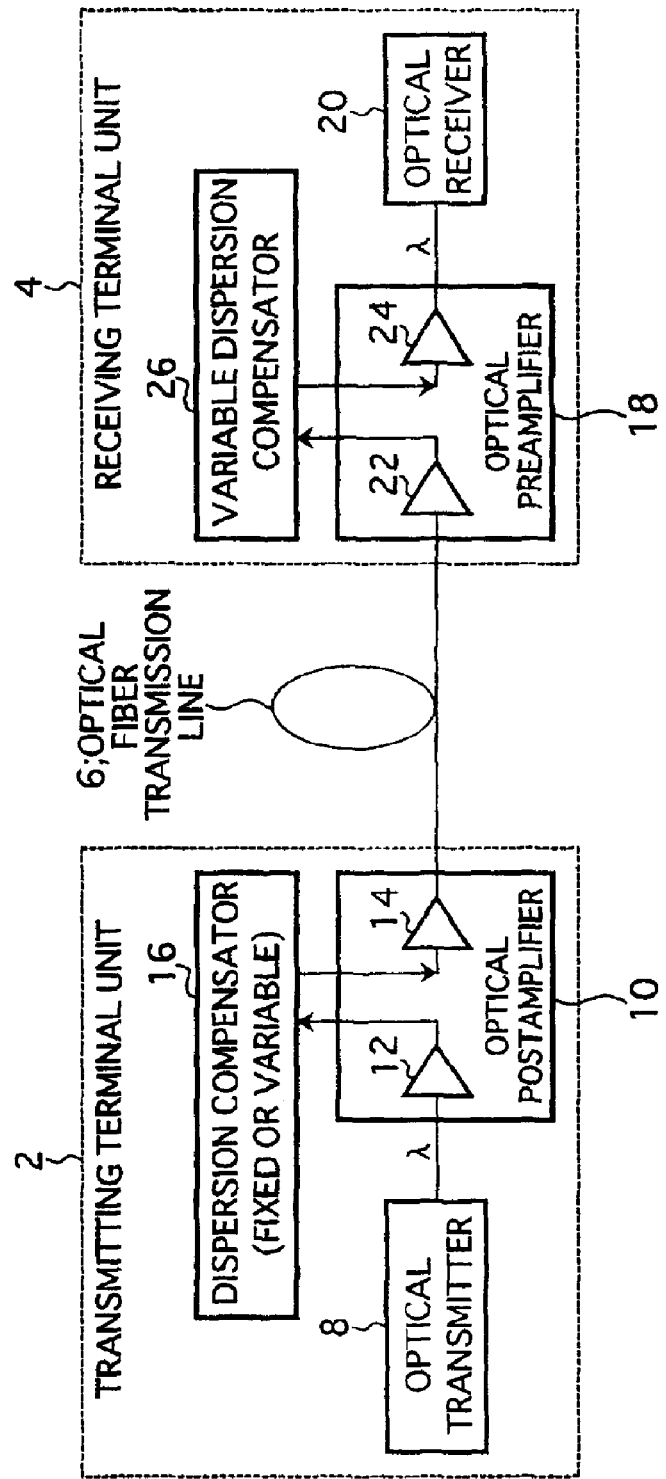
FIG. 1 is a block diagram showing a first preferred embodiment of the system.

FIG. 1 is a block diagram showing a first preferred embodiment of the system. In FIG. 1, a single-wavelength unrepeated transmission system is illustrated. This system includes a transmitting terminal unit 2, a receiving terminal unit 4, and an optical fiber transmission line 6 laid between the terminal units 2 and 4.

The transmitting terminal unit 2 includes an optical transmitter 8 for outputting an optical signal having a wavelength $\lambda$, and an optical postamplifier 10 for amplifying the optical signal output from the optical transmitter 8 and then sending out the optical signal to the optical fiber transmission line 6. The optical postamplifier 10 includes a front-stage optical amplifier 12 and a rear-stage optical amplifier 14. A fixed or variable dispersion compensator 16 is inserted between the optical amplifiers 12 and 14. The number of stages in the optical postamplifier 10 may be changed to any numbers other than two. Further, the position of the dispersion compensator 16 may be changed to any positions with respect to each optical amplifier in the optical postamplifier 10. These changes apply similarly to an optical preamplifier or an optical in-line amplifier, and also to the other following preferred embodiments.

The receiving terminal unit 4 includes an optical preamplifier 18 for amplifying the optical signal transmitted by the optical fiber transmission line 6, and an optical receiver 20 for receiving the optical signal output from the optical preamplifier 18. The optical preamplifier 18 includes a front-stage optical amplifier 22 and a rear-stage optical amplifier 24. A variable dispersion compensator 26 is inserted between the optical amplifiers 22 and 24. Each of the optical amplifiers 12, 14, 22, and 24 may be provided by an erbium doped fiber amplifier (EDFA), for example.

Figure 2:
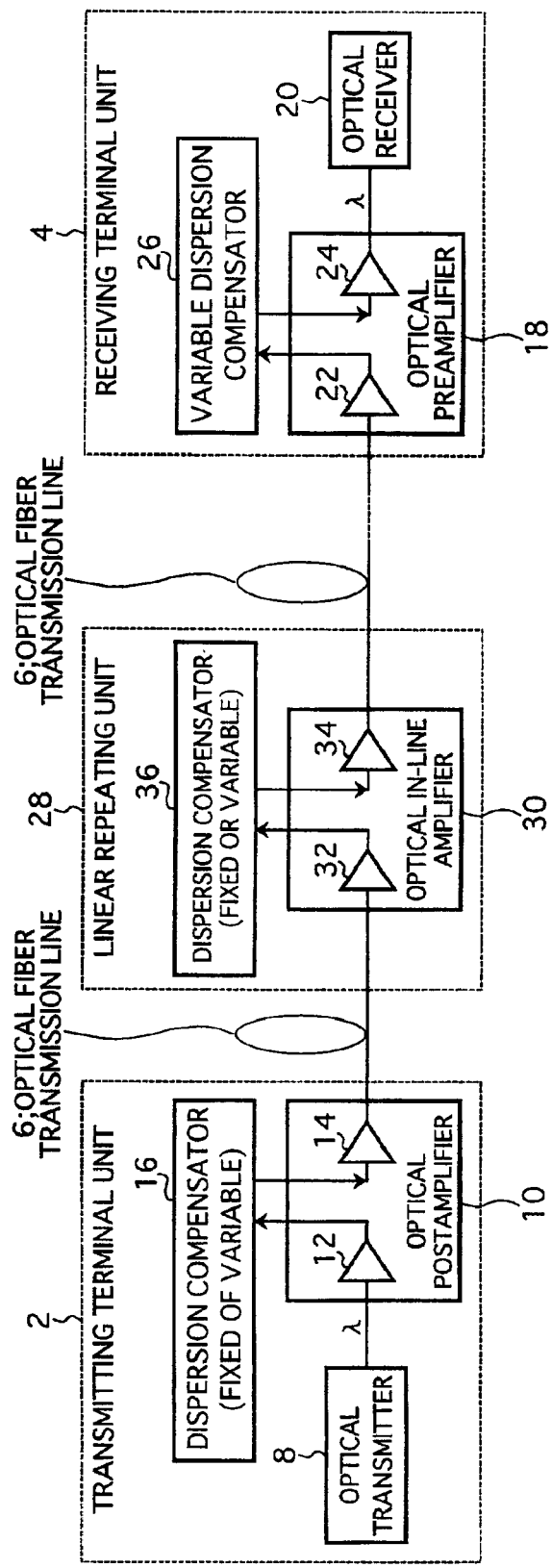
FIG. 2 is a block diagram showing a second preferred embodiment of the system.

FIG. 2 is a block diagram showing a second preferred embodiment of the system. In FIG. 2, a single-wavelength repeatered transmission system is illustrated. In contrast to the system shown in FIG. 1, the system shown in FIG. 2 is characterized in that at least one linear repeating unit 28 is additionally provided along the optical fiber transmission line 6. The linear repeating unit 28 includes an optical in-line amplifier 30 connected to the optical fiber transmission line 6 for applying the optical signal transmitted by the optical fiber transmission line 6. The optical in-line amplifier 30 includes a front-stage optical amplifier 32 and a rear-stage optical amplifier 34. A fixed or variable dispersion compensator 36 is inserted between the optical amplifiers 32 and 34.

Figure 3:
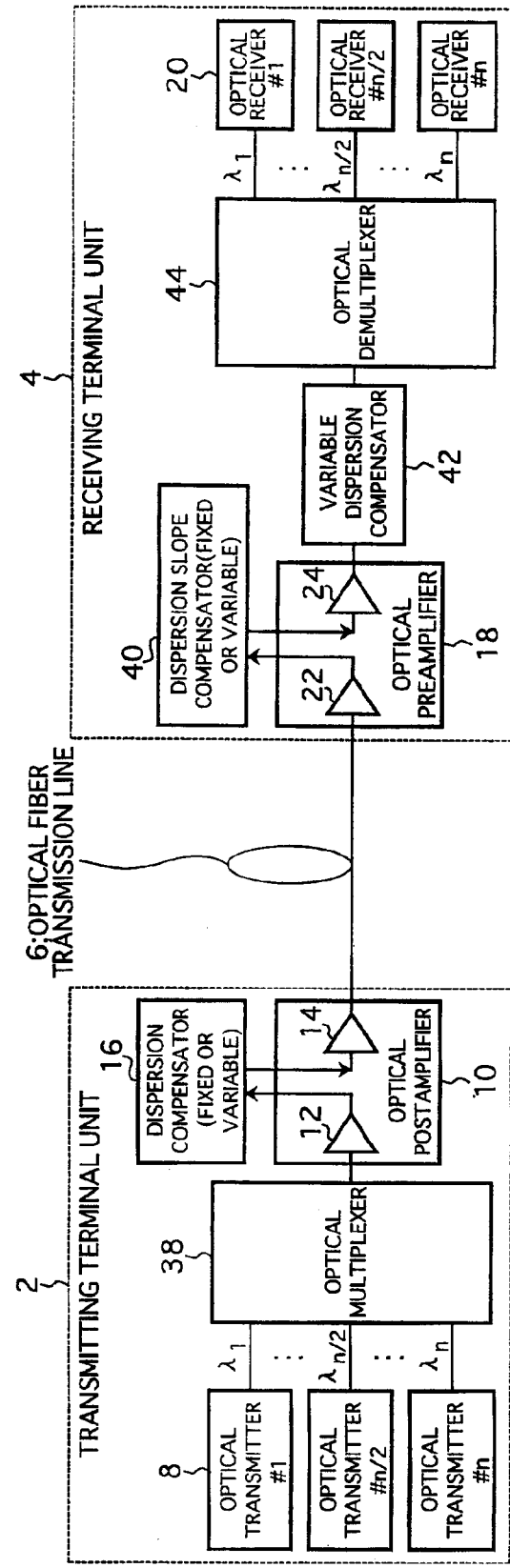
FIG. 3 is a block diagram showing a third preferred embodiment of the system.

FIG. 3 is a block diagram showing a third preferred embodiment of the system. In FIG. 3, a WDM unrepeated transmission system is illustrated. In contrast to the system shown in FIG. 1, the system shown in FIG. 3 is characterized in that the transmitting terminal unit 2 and the receiving terminal unit 4 are so designed as to adapt to WDM.

The transmitting terminal unit 2 in this preferred embodiment includes a plurality of optical transmitters 8(#1) to 8(#n) for respectively outputting a plurality of optical signals having different wavelengths $\lambda_1$ to $\lambda_n$. The optical signals output from the optical transmitters 8(#1) to 8(#n)

are wavelength division multiplexed by an optical multiplexer 38, and resultant WDM signal light is amplified by an optical postamplifier 10. Then, the WDM signal light is sent out to an optical fiber transmission line 6. Like the system shown in FIG. 1, a fixed or variable dispersion compensator 16 is inserted between the front-stage optical amplifier 12 and the rear-stage optical amplifier 14 in the optical postamplifier 10.

In the receiving terminal unit 4, the WDM signal light transmitted by the optical fiber transmission line 6 is amplified by an optical preamplifier 18 and then passed through a variable dispersion compensator 42. A fixed or variable dispersion slope compensator 40 is inserted between the front-stage optical amplifier 22 and the rear-stage optical amplifier 24 in the optical preamplifier 18.

The WDM signal light passed through the dispersion compensator 42 is separated into individual optical signals by an optical demultiplexer 44, and these optical signals are respectively supplied to a plurality of optical receivers 20(#1) to 20(#n).

FIG. 4 is a block diagram showing a fourth preferred embodiment of the system. In FIG. 4, a WDM repeatered transmission system is illustrated. In contrast to the preferred embodiment shown in FIG. 3, the fourth preferred embodiment is characterized in that at least one linear repeating unit 28 similar to that shown in FIG. 2 is additionally provided along the optical fiber transmission line 6.

In the case of transmitting WDM signal light as in the system shown in FIG. 3 or FIG. 4, consideration must be given not only to the chromatic dispersion of the optical fiber transmission line 6, but also to the dispersion slope.

Figure 5:
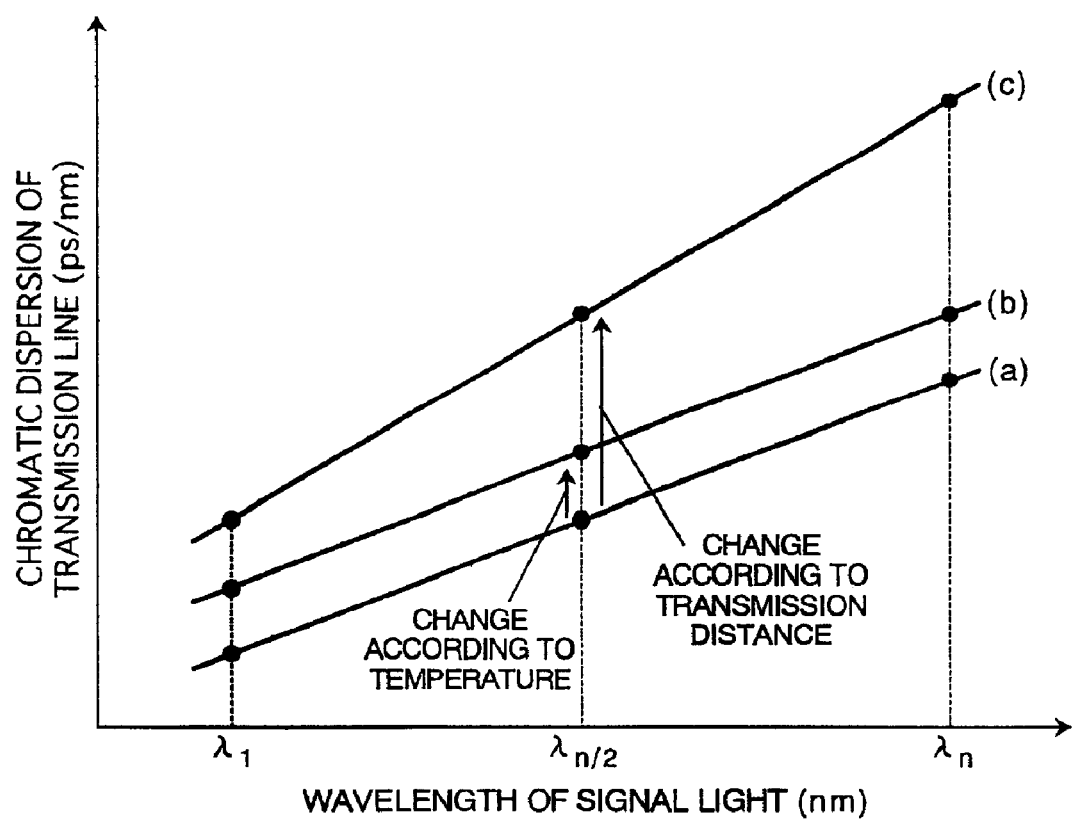
FIG. 5 is a graph for illustrating changes in chromatic dispersion according to a temperature and a transmission distance.

Referring to FIG. 5, there are shown changes in chromatic dispersion according to a change in temperature of a transmission line and a change in transmission distance. In the graph shown in FIG. 5, the vertical axis represents the chromatic dispersion (ps/nm) of a transmission line, and the horizontal axis represents the wavelength (nm) of signal light. Regarding the temperature change, a chromatic dispersion characteristic (a) shifts (translates) to (b) according to the temperature characteristic of zero-dispersion wavelength (about 0.03 nm/° C.). In this case, the dispersion slope does not change. Regarding the transmission distance change, the chromatic dispersion characteristic (a) shifts to (c). In this case, both the chromatic dispersion and the dispersion slope change.

Accordingly, in ultrafast WDM, not only the chromatic dispersion but also the dispersion slope must be compensated. To meet this requirement, the following four methods may be considered.

(1) Realizing a broadband variable dispersion compensator having independently variable chromatic dispersion and dispersion slope to perform simultaneous dispersion compensation of optical signals of all the channels.

(2) Independently arranging a broadband variable dispersion compensator having a variable chromatic dispersion and a broadband variable dispersion slope compensator having a variable dispersion slope to perform simultaneous dispersion compensation of optical signals of all the channels.

(3) Independently arranging a broadband variable dispersion compensator having a variable chromatic dispersion and a fixed dispersion slope compensator having a dispersion slope according to a transmission line length to perform simultaneous dispersion compensation of optical signals of all the channels.

(4) Individually arranging variable dispersion compensators each having a variable chromatic dispersion on all the channels to perform dispersion compensation. Any one of the above methods (1) to (4) is thought to be selected according to the realizability of a variable dispersion compensator, and in addition a method of arranging a dispersion monitor becomes the key to realizing a low cost in any selected one of the methods (1) to (4).

For example, in the case of the method (1) or (2), the dispersion monitor is arranged so that the chromatic dispersion can be detected on at least two of the plural WDM channels, such as on the opposite two channels. In this case, the dispersion slope can be obtained by extrapolation, and the chromatic dispersion on the other channels can be detected.

Further, in the case of the method (3), utilizing the fact that the dispersion slope of a transmission line does not change with a temperature change, the dispersion monitor is arranged so that the chromatic dispersion can be detected on at least one of the plural WDM channels, such as on the central channel. In this case, the chromatic dispersion on the other channels can be detected from the above-detected chromatic dispersion and the known dispersion slope.

Further, in the case of the method (4), the dispersion monitor is arranged so that the chromatic dispersion on at least one channel can be detected if the dispersion slope (or transmission line length) is known, or so that the chromatic dispersion on at least two channels can be detected if the dispersion slope is unknown. In this case, the chromatic dispersion on the other channels can be detected by extrapolation.

Figure 6:
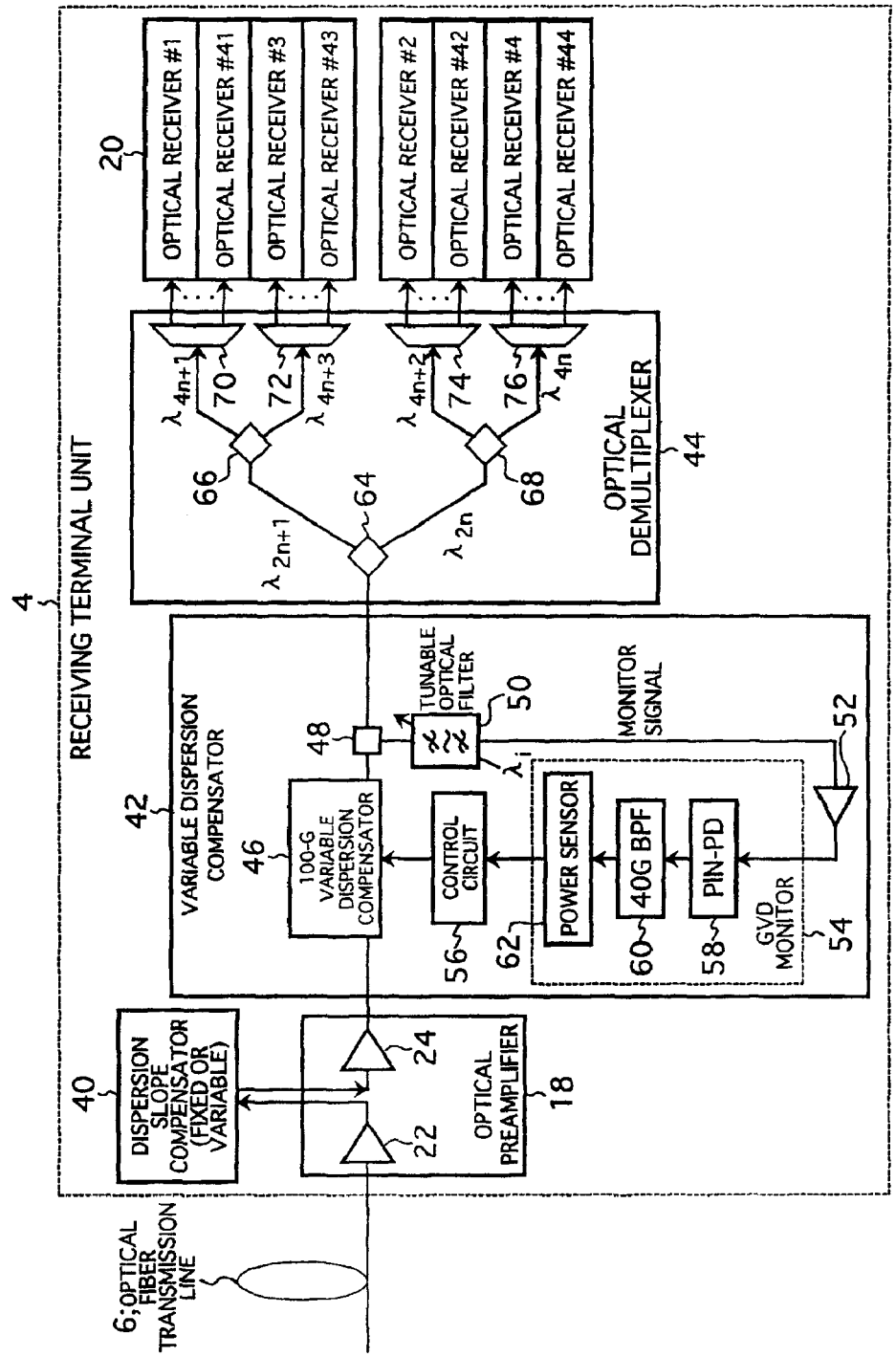
FIG. 6 is a block diagram showing a first preferred embodiment of the receiving terminal unit.

FIG. 6 is a block diagram showing a first preferred embodiment of the receiving terminal unit. More specifically, FIG. 6 shows a specific configuration of the receiving terminal unit 4 shown in FIG. 3, for example.

The variable dispersion compensator 42 includes a 100-G variable dispersion compensator 46, an optical coupler 48 for extracting monitor light from an output from the dispersion compensator 46, a tunable optical filter 50 for passing the monitor light, an optical amplifier 52 for amplifying an output from the filter 50, a dispersion monitor (GVD monitor) 54 for accepting an output from the optical amplifier 52, and a control circuit 56 for controlling the dispersion compensator 46 according to an output from the monitor 54. The dispersion monitor 54 includes a PIN-PD (photodiode) 58 for converting the optical output from the optical amplifier 52 into an electrical signal, a bandpass filter (BPF) 60 for extracting a 40-GHz component from an output from the PIN-PD 58, and a power sensor 62 for detecting the power or intensity of an output from the bandpass filter 60.

For example, in the case that the channel spacing in WDM signal light at 40 Gb/s per channel is 100 GHz, the chromatic dispersion can be given by using the 100-G variable dispersion compensator 46 whose transmission characteristic is optimized at internals of 100 GHz, and the dispersion slope can be given by using the fixed or variable dispersion slope compensator 40.

Figure 7:
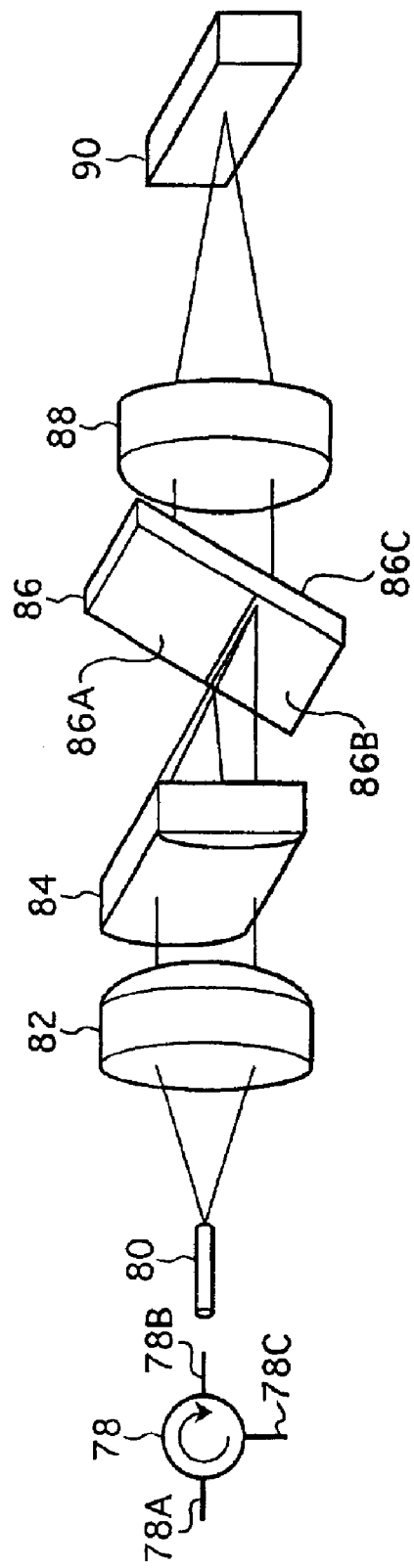
FIG. 7 is a schematic view showing a specific configuration of the variable dispersion compensator.

Referring to FIG. 7, there is shown a specific configuration of the 100-G variable dispersion compensator 46 using a VIPA (Virtually Imaged Phased Array) as an example. This configuration includes an optical circulator 78, optical fiber 80, collimating lens 82, semicylindrical lens 84, glass plate 86, focusing lens 88, and mirror 90 arranged in this order along an optical axis.

The optical circulator 78 has ports 78A, 78B, and 78C, and functions in such a manner that light supplied to the port 78A is output from the port 78B and light supplied to the port 78B is output from the port 78C. Accordingly, the ports 78A and 78C can be used as an input and an output, respectively.

The glass plate 86 has an input surface consisting of an upper portion 86A and a lower portion 86B, and an output surface 86C. The reflectances of the upper portion 86A, the lower portion 86B, and the output surface 86C are set to 100%, 0%, and 98%, respectively, for example, and a beam waist by the semicylindrical lens 84 is substantially positioned on the output surface 86C. Additional information on the VIPA is described in detail in M. Shirasaki et al., "Dispersion Compensation Using the Virtually Imaged Phased Array", APCC/OECC '99, pp. 1367–1370.

In the configuration shown in FIG. 7, the dispersion can be varied by fixing the distance between the focusing lens 88 and the mirror 90 and changing the distance between the focusing lens 88 and the glass plate 86.

The operation principle of the dispersion monitor 54 shown in FIG. 6 will now be described. This operation principle is based on the experimental results disclosed in Y. Akiyama et al., "Automatic Dispersion Equalization in 40-Gbit/s Transmission by Seamless-switching between Multiple Signal Wavelengths", ECOC '99, pp.I-150–151. That is, 40-Gb/s NRZ optical signals are transmitted by a 100-km DSF accommodated in a thermostatic bath in which the temperature is variable (−35° C. to +65° C.), and thereafter the dispersion is monitored by a dispersion monitor as shown in FIG. 6.

Figure 8:
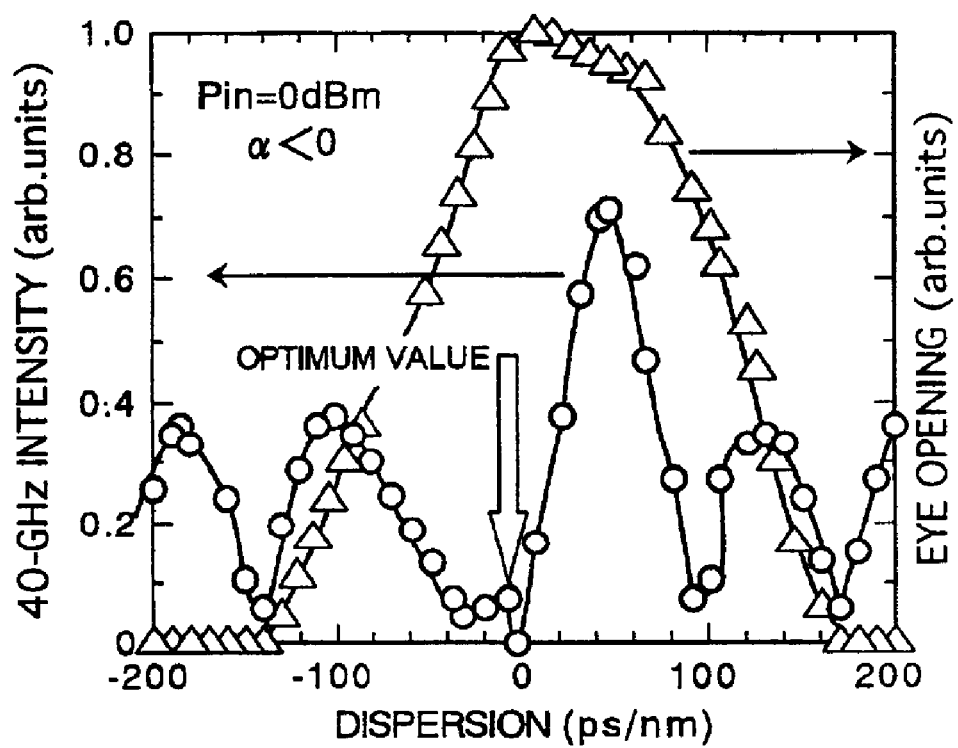
FIG. 8 is a graph of calculated results for illustrating the operation principle of the dispersion monitor.

As apparent from the graph of calculated results shown in FIG. 8, the intensity of a 40-GHz component changes according to chromatic dispersion, and becomes zero when the dispersion is zero.

Further, in the graph of experimental results shown in FIG. 9, a 40-GHz component intensity characteristic similar to the calculated results is obtained because the dispersion of the transmission line changes with wavelength. The zero-dispersion wavelength of the transmission line changes at about 0.03 nm/° C. with a change in temperature of the transmission line, and the minimum point of the 40-GHz component intensity changes with such a temperature change.

Also in another modulation method, it is known that the intensity of a B Hz component can be used as a dispersion monitor signal with respect to a B b/s modulating signal. For example, it is known that the B Hz component intensity becomes maximum when the chromatic dispersion is zero with respect to an RZ signal and that it becomes minimum with respect to an OTDM (optical time division multiplexed) signal (Japanese Patent Application No. Hei 9-224056).

Referring again to FIG. 6, the optical demultiplexer 44 includes an interleaver (100-G/200-G) 64 for dividing the WDM signal light into a group of optical signals having wavelengths $\lambda_{2n+1}$ and a group of optical signals having wavelengths $\lambda_{2n}$, an interleaver (200-G/400-G) 66 for dividing the group of optical signals having the wavelengths $\lambda_{2n+1}$ into a group of optical signals having wavelengths $\lambda_{4n+1}$ and a group of optical signals having wavelengths $\lambda_{4n+3}$, an interleaver (200-G/400-G) 68 for dividing the group of optical signals having the wavelengths $\lambda_{2n}$ into a group of optical signals having wavelengths $\lambda_{4n+2}$ and a group of optical signals having wavelengths $\lambda_{4n}$, an optical demultiplexer 70 for dividing the group of optical signals having the wavelengths $\lambda_{4n+1}$ into individual optical signals, an optical demultiplexer 72 for dividing the group of optical signals having the wavelengths $\lambda_{4n+3}$ into individual optical signals, an optical demultiplexer 74 for dividing the group of optical signals having the wavelengths $\lambda_{4n+2}$ into individual optical signals, and an optical demultiplexer 76 for dividing the group of optical signals having the wavelengths $\lambda_{4n}$ into individual optical signals.

In the example shown, the number of the optical receivers 20(#1) to 20(#n) is 44. Further, it should be noted that the symbol n in the suffix attached to the symbol λ representing wavelength is different from the symbol n in the optical receiver 20(#n).

Figure 10:
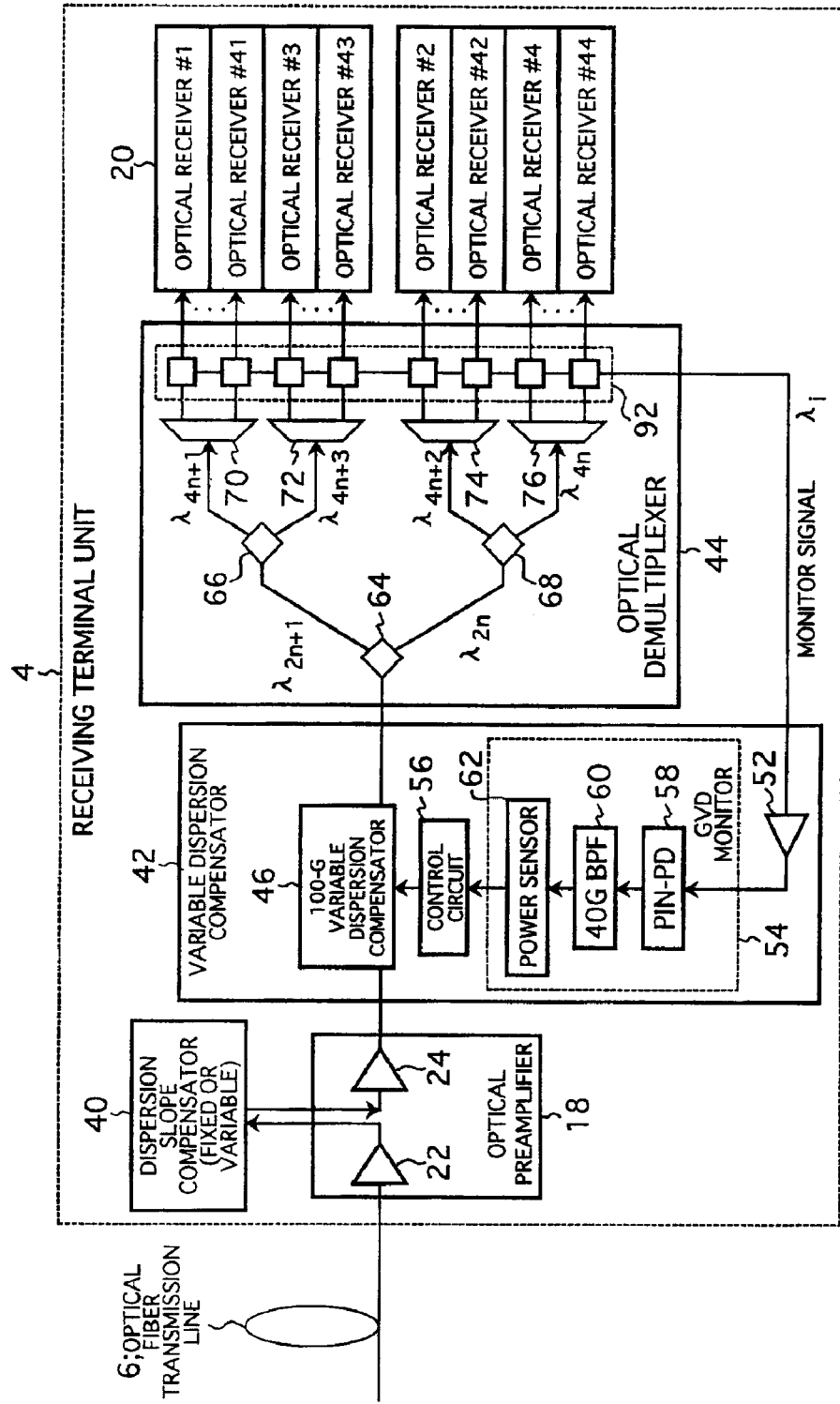
FIG. 10 is a block diagram showing a second preferred embodiment of the receiving terminal unit.

FIG. 10 is a block diagram showing a second preferred embodiment of the receiving terminal unit. In the preferred embodiment shown in FIG. 6, the tunable optical filter 50 passes an optical signal of at least one channel of the WDM signal light as monitor light, and the control circuit 56 controls the variable dispersion compensator 46 according to a detected value of the chromatic dispersion from the monitor light. In contrast thereto, the preferred embodiment shown in FIG. 10 is characterized in that an optical switch 92 is connected to an output of each channel of the optical demultiplexer 44, so as to extract an optical signal of at least one channel as monitor light. Then, the dispersion monitor 54 detects chromatic dispersion according to the monitor light, and the control circuit 56 controls the variable dispersion compensator 46 according to a detected value of the chromatic dispersion.

Figure 11:
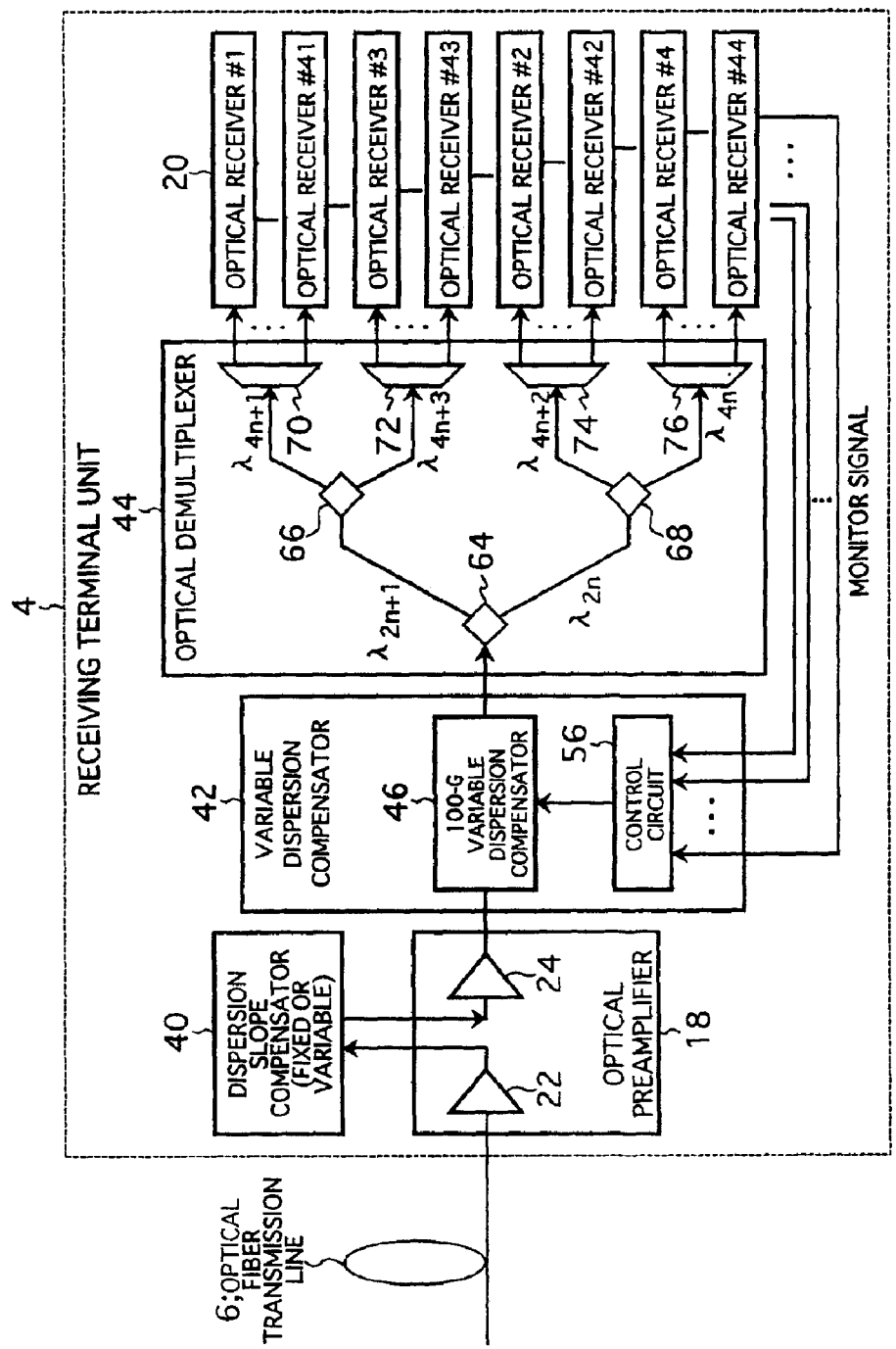
FIG. 11 is a block diagram showing a third preferred embodiment of the receiving terminal unit.

FIG. 11 is a block diagram showing a third preferred embodiment of the receiving terminal unit. In contrast to the preferred embodiment shown in FIG. 10 wherein the control of the variable dispersion compensator 46 is performed according to the result of monitoring of the chromatic dispersion of each optical signal, the preferred embodiment shown in FIG. 11 is characterized in that the control circuit 56 controls the variable dispersion compensator 46 according to a dispersion monitor signal (extracted clock signal, bit error rate characteristic, Q factor, etc.) obtained in each of the optical receivers 20(#1) to 20(#n). Accordingly, this preferred embodiment can eliminate the need for provision of the dispersion monitor 54 in the variable dispersion compensator 42 (see FIG. 10, for example).

Figure 12:
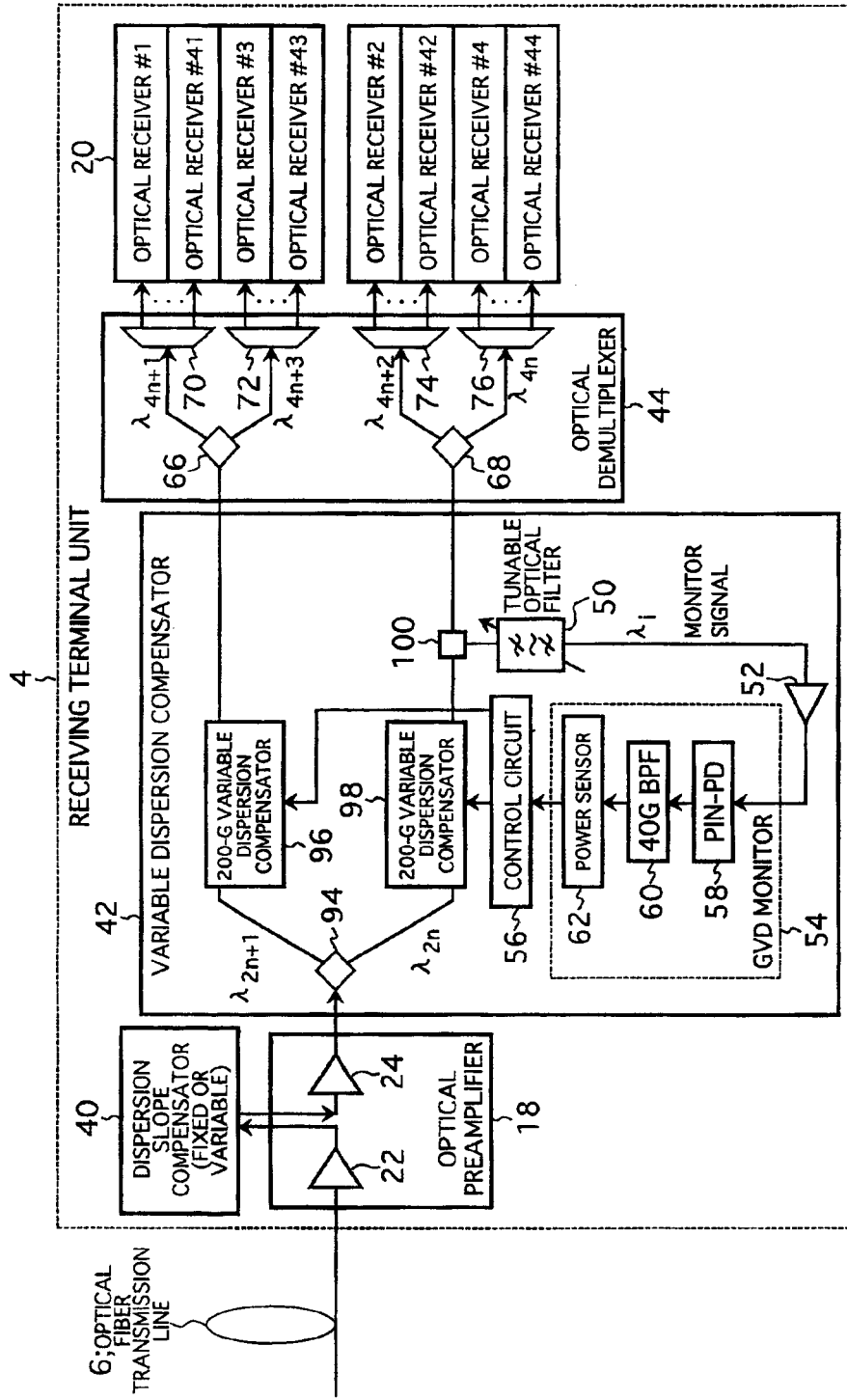
FIG. 12 is a block diagram showing a fourth preferred embodiment of the receiving terminal unit.

FIG. 12 is a block diagram showing a fourth preferred embodiment of the receiving terminal unit. In this preferred embodiment, an interleaver 94 corresponding to the interleaver 64 in the optical demultiplexer 44 shown in FIG. 6 is provided in the variable dispersion compensator 42. Then, the group of optical signals of odd channels from the interleaver 94 is passed through a 200-G variable dispersion compensator 96, and the group of optical signals of even channels from the interleaver 94 is passed through a 200-G variable dispersion compensator 98. Outputs from the dispersion compensators 96 and 98 are supplied to the interleavers 66 and 68 in the optical demultiplexer 44, respectively.

Figure 32:
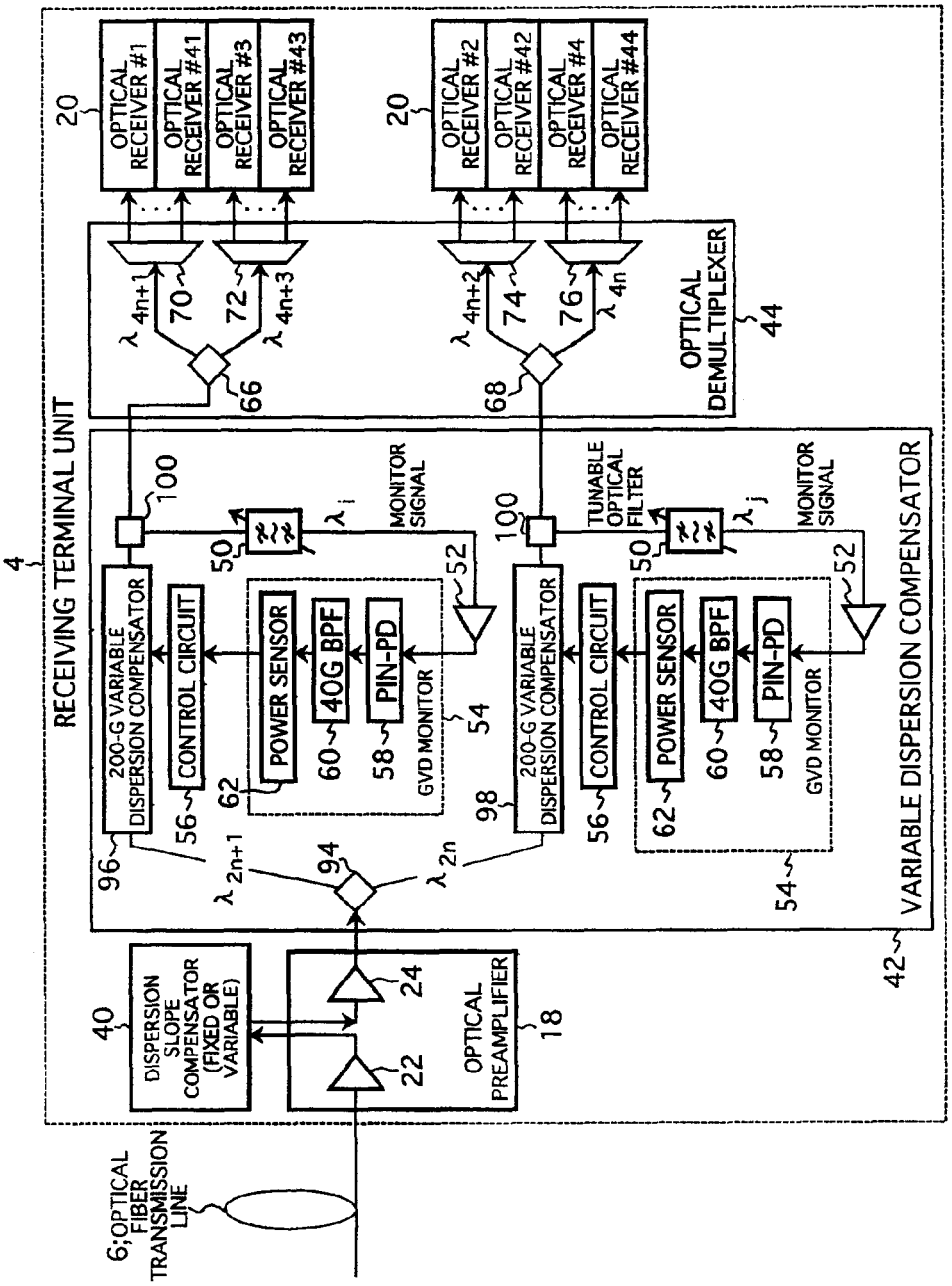
FIG. 32 is a block diagram showing an eleventh preferred embodiment of the receiving terminal unit.

Monitor light is extracted from the output from the dispersion compensator 98 by an optical coupler 100. The dispersion monitor 54 detects chromatic dispersion of at least one channel according to the monitor light, and the control circuit 56 controls the dispersion compensators 96 and 98 according to the result of this detection. While only the output from the dispersion compensator 98 is monitored in this preferred embodiment, both the dispersion compensators 96 and 98 may be individually controlled by similar control loops as shown in FIG. 32 to allow high-precision control.

The preferred embodiment shown in FIG. 6 employs the 100-G variable dispersion compensator 46 whose transmission characteristic is optimized at intervals of 100 GHz. In contrast thereto, the preferred embodiment shown in FIG. 12 employs the 200-G variable dispersion compensators 96 and 98 whose transmission characteristics are optimized at intervals of 200 GHz, so that the band characteristic of a dispersion compensator can be easily ensured. Further, the interleaver may be further multi-staged (at intervals of 400 GHz, 800 GHz, and so on) to allow the use of a variable dispersion compensator increased in wavelength spacing.

The configuration using the optical switches shown in FIG. 10 may be applied to the preferred embodiment shown in FIG. 12.

Figure 13:
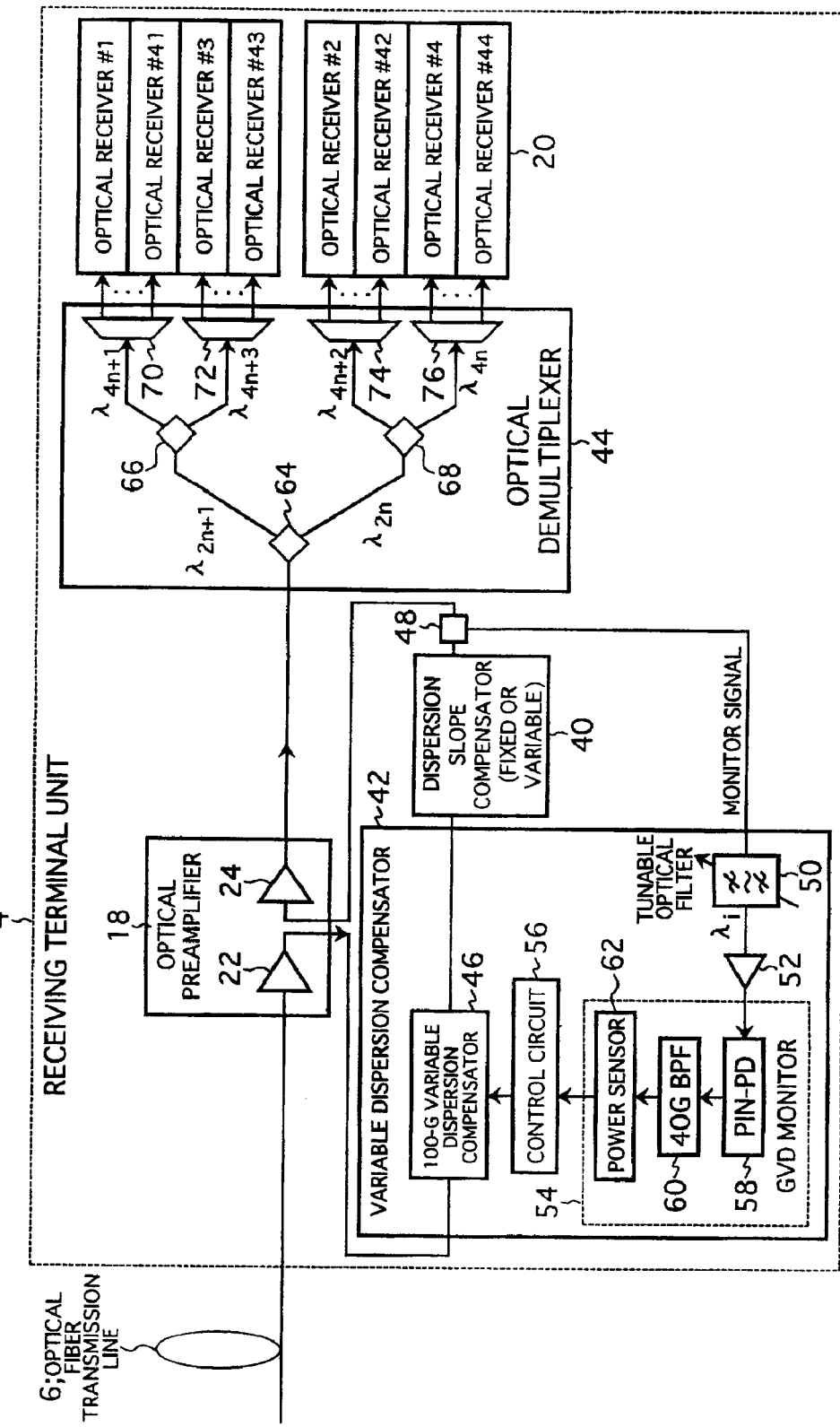
FIG. 13 is a block diagram showing a fifth preferred embodiment of the receiving terminal unit.

FIG. 13 is a block diagram showing a fifth preferred embodiment of the receiving terminal unit. This preferred embodiment is characterized in that the variable dispersion compensator 42 and the dispersion slope compensator 40 are inserted between the front-stage optical amplifier 22 and the rear-stage optical amplifier 24 of the optical preamplifier 18. Monitor light is extracted from an output from the dispersion slope compensator 40, and the 100-G variable dispersion compensator 46 is controlled according to the result of monitoring of chromatic dispersion from the monitor light. Also with this configuration, the dispersion compensation of all the channels can be effectively performed.

The optical switches as shown in FIG. 10 may be applied to the preferred embodiment shown in FIG. 13.

Figure 14:
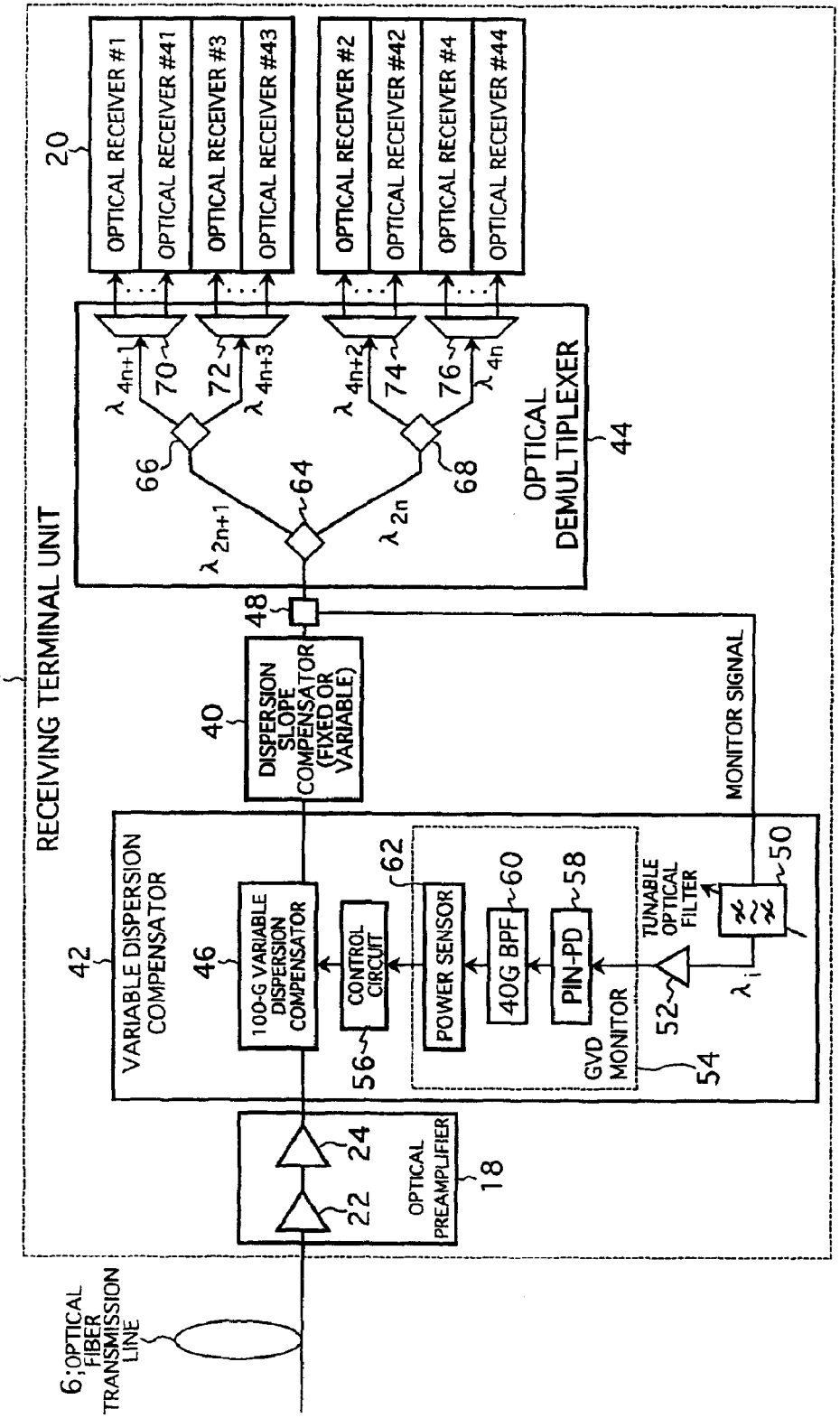
FIG. 14 is a block diagram showing a sixth preferred embodiment of the receiving terminal unit.

FIG. 14 is a block diagram showing a sixth preferred embodiment of the receiving terminal unit. In this preferred embodiment, the variable dispersion compensator 42 and the dispersion slope compensator 40 are inserted between the optical preamplifier 18 and the optical demultiplexer 44. Monitor light is extracted from an output from the dispersion slope compensator 40, and the 100-G variable dispersion compensator 46 is controlled according to the result of monitoring of chromatic dispersion from the monitor light. Also with this configuration, the dispersion compensation of all the channels can be effectively performed.

The optical switches as shown in FIG. 10 may be applied to the preferred embodiment shown in FIG. 14.

Figure 15:
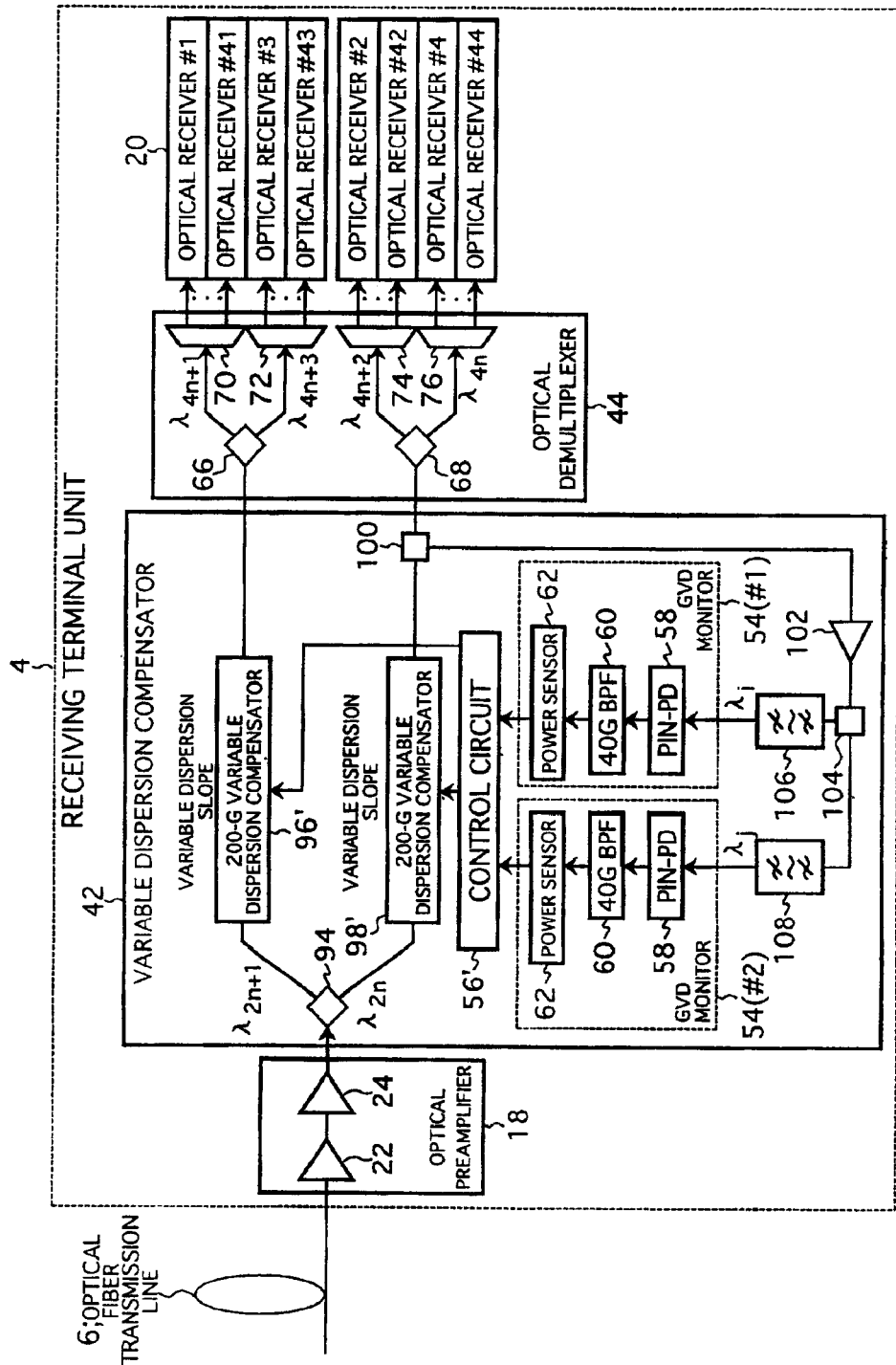
FIG. 15 is a block diagram showing a seventh preferred embodiment of the receiving terminal unit.

FIG. 15 is a block diagram showing a seventh preferred embodiment of the receiving terminal unit. In contrast to the preferred embodiment shown in FIG. 12, the seventh preferred embodiment is characterized in that 200-G variable dispersion compensators 96' and 98' each having a variable dispersion slope are used. The chromatic dispersion of at least two channels of the WDM signal light is monitored, and a dispersion slope is detected from monitored values of the chromatic dispersion, thereby allowing dispersion compensation and dispersion slope compensation by means of the dispersion compensators 96' and 98'. This configuration will now be described more specifically.

The monitor light amplified by an optical amplifier 102 is branched into two components by an optical coupler 104. The two components are supplied to optical bandpass filters 106 and 108, respectively. An optical signal having a wavelength $\lambda_i$ passed through the optical bandpass filter 106 is supplied as first monitor light to a dispersion monitor 54(#1), whereas an optical signal having a wavelength $\lambda_j$ passed through the optical bandpass filter 108 is supplied as second monitor light to a dispersion monitor 54(#2). The result of monitoring of the chromatic dispersion related to the first monitor light is supplied from the dispersion monitor 54(#1) to a control circuit 56', whereas the result of monitoring of the chromatic dispersion related to the second monitor light is supplied from the dispersion monitor 54(#2) to the control circuit 56'. The control circuit 56' controls the amounts of compensation for the chromatic dispersion and the amounts of compensation for the dispersion slope in the dispersion compensators 96' and 98' according to the two supplied results of monitoring of the chromatic dispersion.

With this configuration, the dispersion compensators 96' and 98' can compensate not only the chromatic dispersion but also the dispersion slope. Accordingly, the dispersion compensation of all the channels of the WDM signal light can be effectively performed without the use of the dispersion slope compensator 40 shown in FIG. 12.

Figure 16:
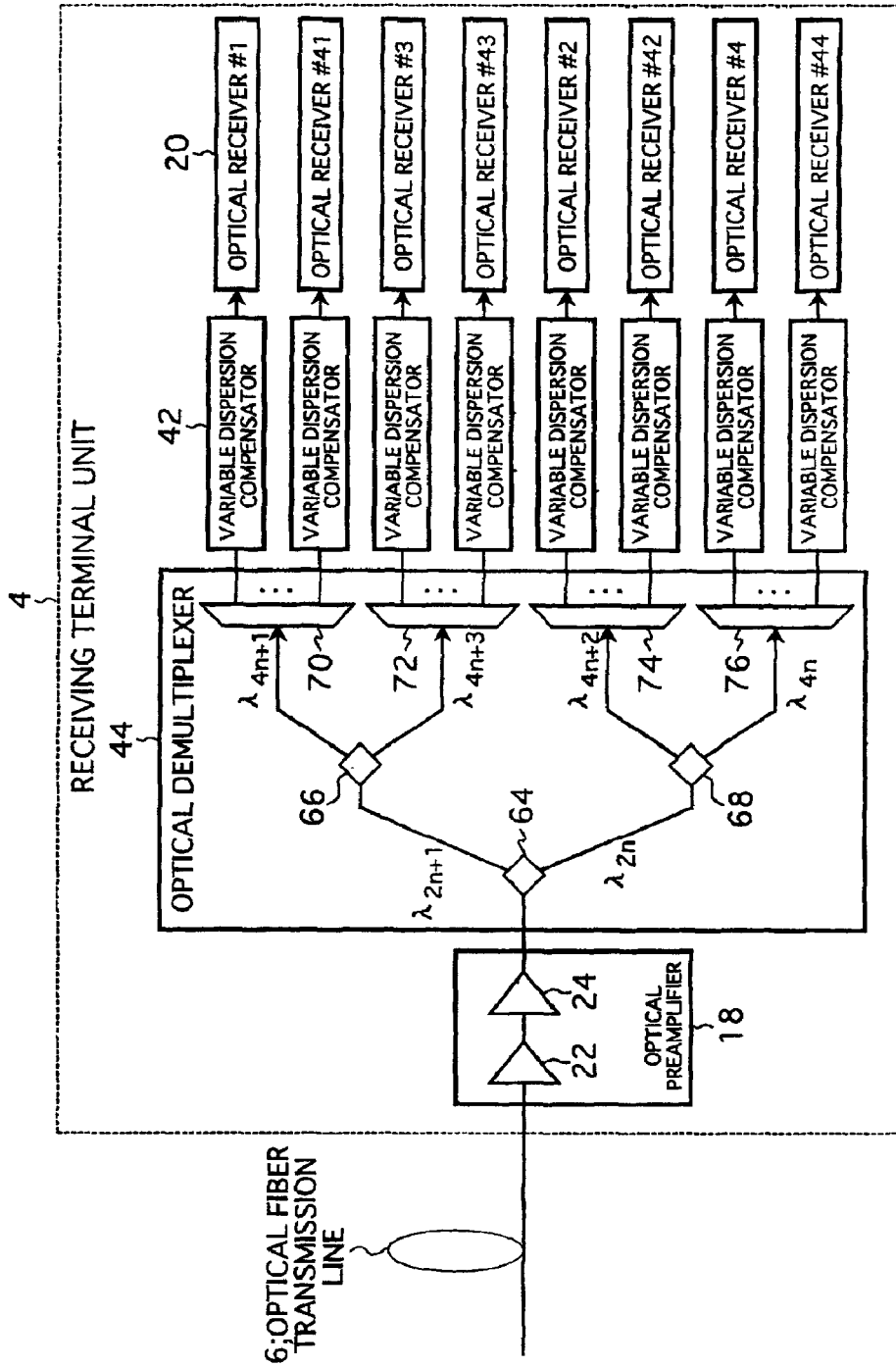
FIG. 16 is a block diagram showing an eighth preferred embodiment of the receiving terminal unit.

FIG. 16 is a block diagram showing an eighth preferred embodiment of the receiving terminal unit. In this preferred embodiment, a plurality of variable dispersion compensators 42 respectively corresponding to the WDM channels are provided at the outputs of the optical demultiplexer 44. Each variable dispersion compensator 42 may be obtained by removing the tunable optical filter 50 from the configuration of the variable dispersion compensator 42 shown in FIG. 6, for example. With this configuration, the dispersion compensation of all the channels of the WDM signal light can be effectively performed without the use of a dispersion slope compensator.

In modification, a preferred embodiment using the optical switches shown in FIG. 10 to control all the variable dispersion compensators with a dispersion monitor or monitors for one or two wavelengths, for example, or a preferred embodiment using a monitor signal from each optical receiver as shown in FIG. 11 may be applied to the preferred embodiment shown in FIG. 16.

Figure 33:
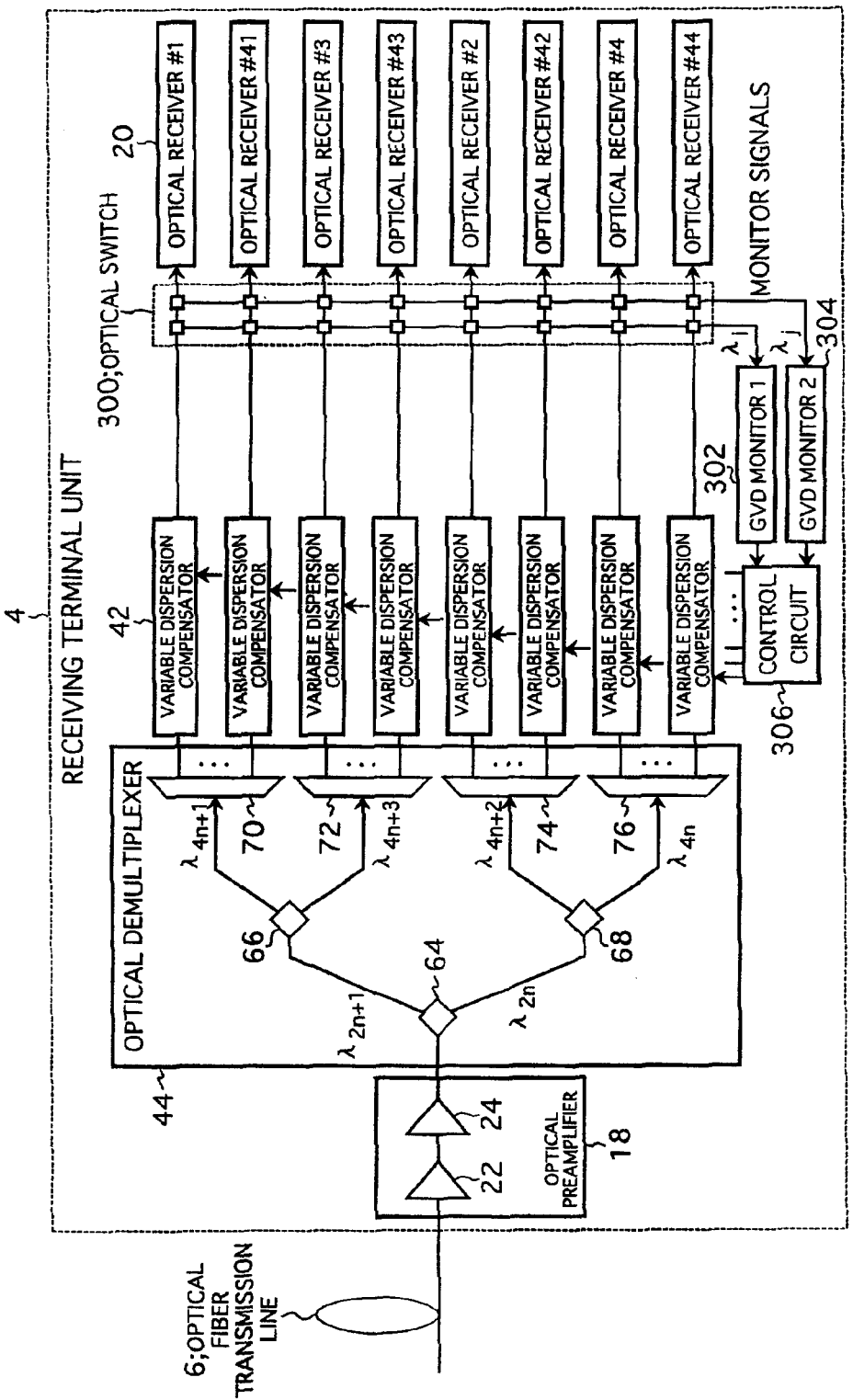
FIG. 33 is a block diagram showing a twelfth preferred embodiment of the receiving terminal unit.

While it is preferable to provide a plurality of dispersion monitors respectively corresponding to all the variable dispersion compensators 42 in FIG. 16, a preferred embodiment shown in FIG. 33 may be adopted. In the preferred embodiment shown in FIG. 33, a plurality of optical switches 300 are provided at the inputs of all the optical receivers 20, respectively, and two monitor signals having wavelengths $\lambda_i$ and $\lambda_j$ are extracted from at least one of the optical switches 300. Two GVD monitors 302 and 304 are provided to detect chromatic dispersion and dispersion slope according to the two monitor signals, and a control circuit 306 is provided to control all the variable dispersion compensators 42 according to outputs from the GVD monitors 302 and 304.

Figure 17:
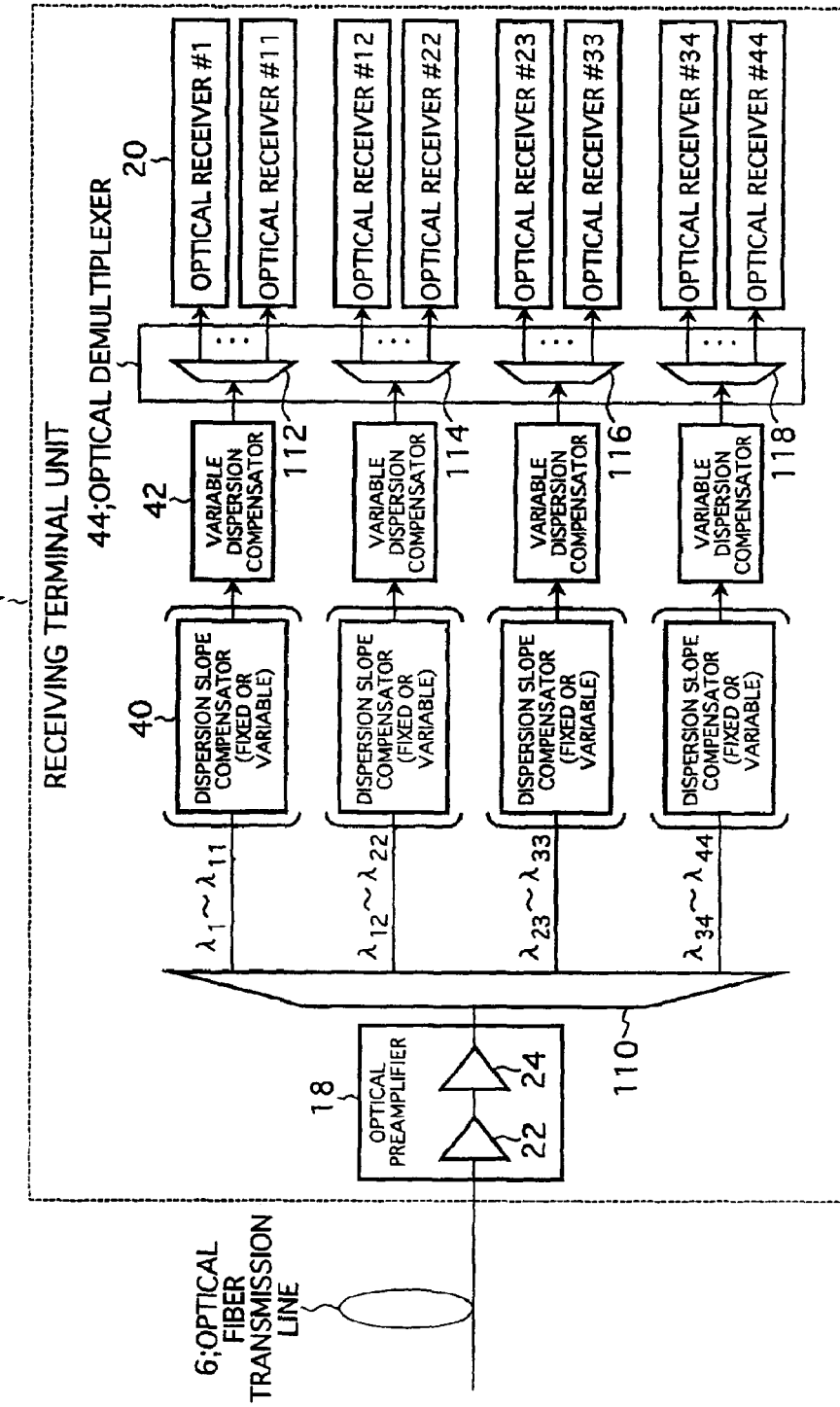
FIG. 17 is a block diagram showing a ninth preferred embodiment of the receiving terminal unit.

FIG. 17 is a block diagram showing a ninth preferred embodiment of the receiving terminal unit. The WDM signal light output from the optical preamplifier 18 is divided into a group of optical signals having wavelengths $\lambda_1$ to $\lambda_{11}$, a group of optical signals having wavelengths $\lambda_{12}$ to $\lambda_{22}$, a group of optical signals having wavelengths $\lambda_{23}$ to $\lambda_{33}$, and a group of optical signals having wavelengths $\lambda_{34}$ to $\lambda_{44}$ by a band dividing section 110. These four groups of optical signals are respectively passed through four variable dispersion compensators 42 and then supplied to an optical demultiplexer 44. A fixed or variable dispersion slope compensator 40 is provided at the input or output of each variable dispersion compensator 42 as required.

The optical demultiplexer 44 includes four optical demultiplexers 112, 114, 116, and 118 respectively corresponding to the wavelength bands of $\lambda_1$ to $\lambda_{11}$, $\lambda_{12}$ to $\lambda_{22}$, $\lambda_{23}$ to $\lambda_{33}$, and $\lambda_{34}$ to $\lambda_{44}$. Each of the optical demultiplexers 112, 114, 116, and 118 divides the corresponding group of optical signals into individual optical signals. The individual optical signals are supplied to the optical receivers 20(#1) to 20(#44), respectively.

With this configuration, the band of the WDM signal light is divided into a plurality of (four) bands according to the magnitude of wavelength, so that the dispersion compensation can be easily simultaneously performed in each band. Further, the compensation characteristic required in each variable dispersion compensator 42 can be relaxed.

Figure 18:
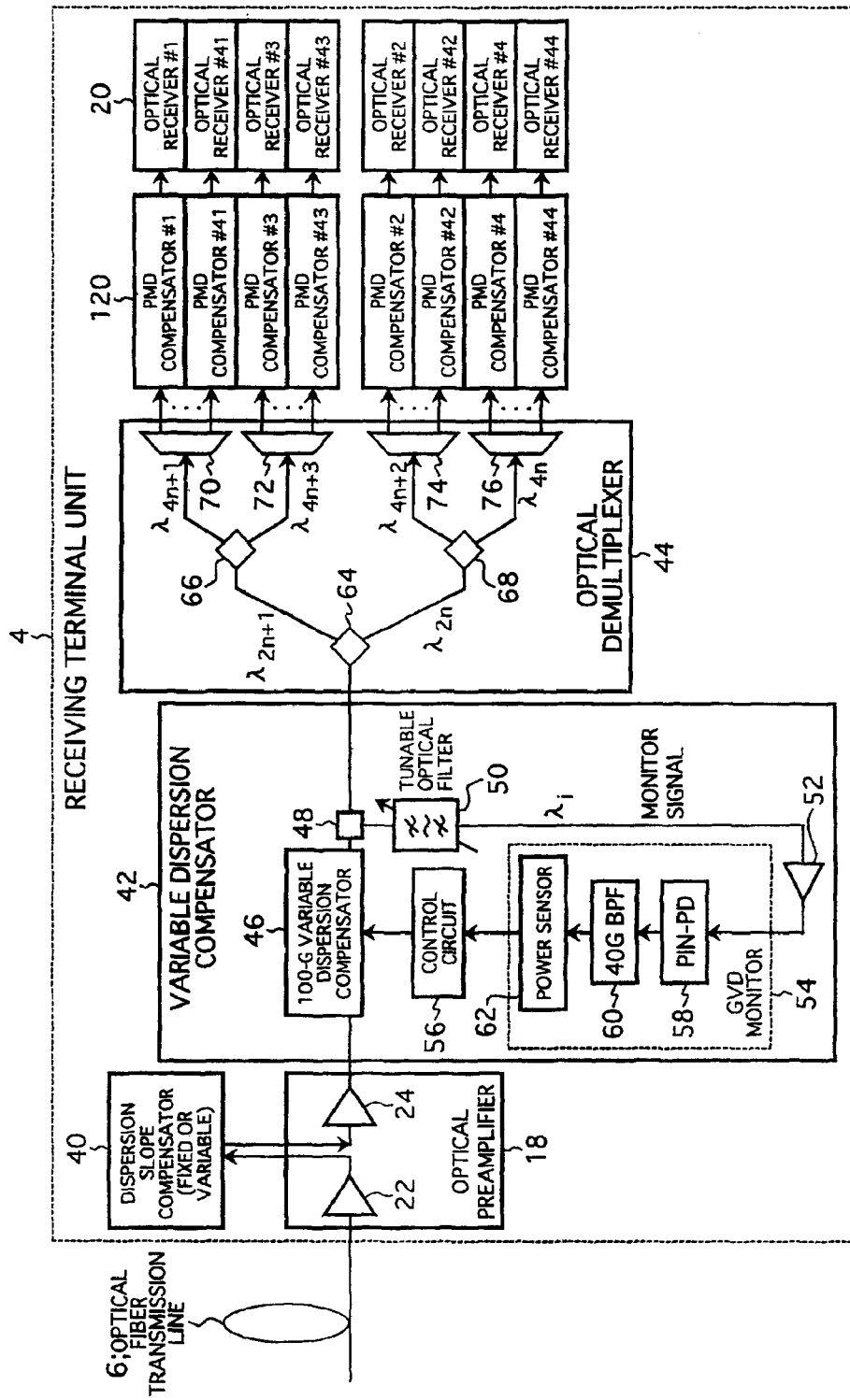
FIG. 18 is a block diagram showing a tenth preferred embodiment of the receiving terminal unit.

FIG. 18 is a block diagram showing a tenth preferred embodiment of the receiving terminal unit. In contrast to the preferred embodiment shown in FIG. 6, the tenth preferred embodiment is characterized in that a plurality of PMD (polarization mode dispersion) compensators 120(#1) to 120(#44) are additionally provided between the optical demultiplexer 44 and the optical receivers 20(#1) to 20(#44), respectively. By additionally compensating for PMD of each channel, not only the dispersion compensation of all the channels of the WDM signal light can be effectively performed, but also a transmission quality can be further improved by the compensation for PMD.

Figure 19:
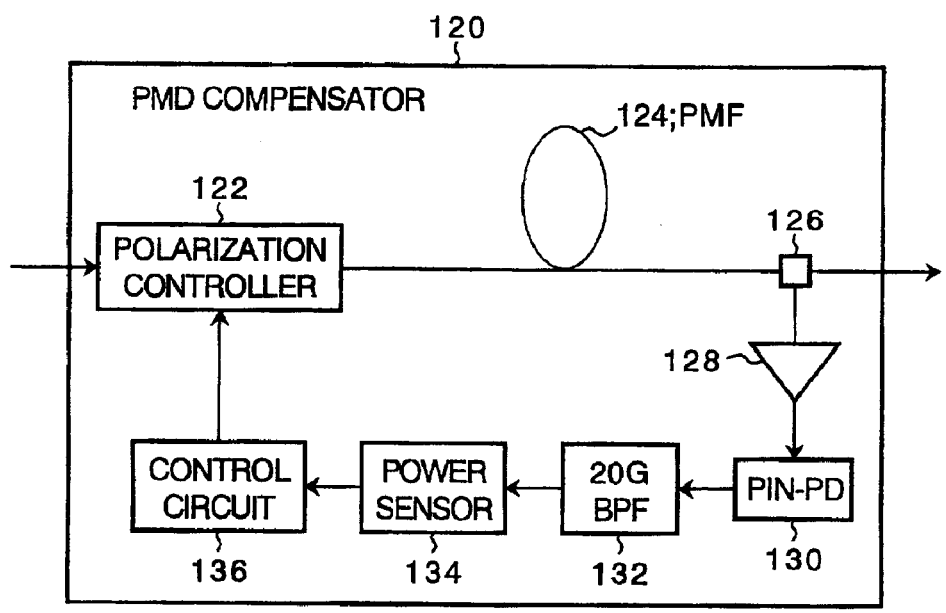
FIG. 19 is a block diagram showing a preferred embodiment of a PMD compensator.

FIG. 19 is a block diagram showing a specific configuration of each PMD compensator 120. The PMD compensator 120 includes a polarization controller 122 for receiving an optical signal, a PMF (polarization maintaining fiber) 124 for accepting an output from the polarization controller 122, an optical coupler 126 for extracting monitor light from an output from the PMF 124, an optical amplifier 128 for amplifying the extracted monitor light, a PIN-PD 130 for converting an optical output from the optical amplifier 128 into an electrical signal, a bandpass filter 132 for passing an output signal from the PIN-PD 130, a power sensor 134 for detecting the power of an output from the filter 132, and a control circuit 136 for controlling the polarization controller 122 according to an output from the power sensor 134. The center frequency in the pass band of the bandpass filter 132 is set to 20 GHz because the bit rate of the optical signal is 40 Gb/s.

Additional information on the operation principle or the like of such a PMD compensator is described in detail in Japanese Patent Application No. Hei 11-515959.

Figure 20:
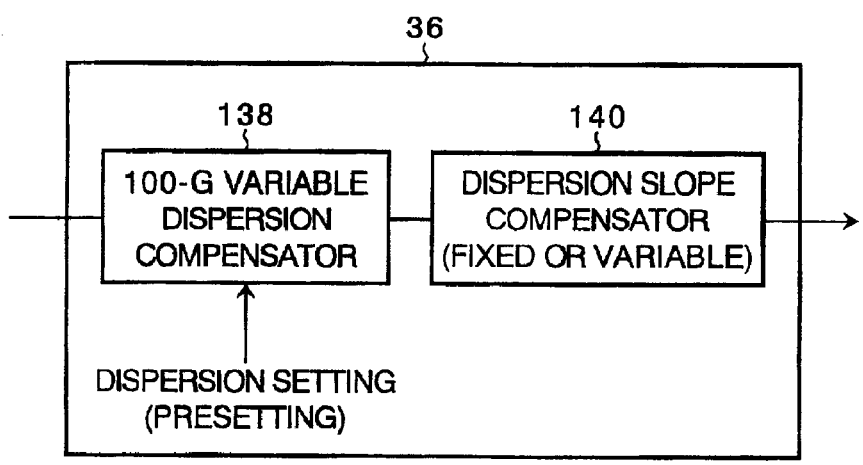
FIG. 20 is a block diagram showing a first preferred embodiment of the variable dispersion compensator applicable to the linear repeating unit.

FIG. 20 is a block diagram showing a first preferred embodiment of the dispersion compensator 36 applicable to the linear repeating unit 28 shown in FIG. 4, for example. This dispersion compensator 36 includes a 100-G variable dispersion compensator 138 and a fixed or variable dispersion slope compensator 140 connected in series for passing WDM signal light. In the case of transmitting WDM signal light whose optical signals each having a bit rate of 40 Gb/s are arranged at a channel spacing of 100 GHz as similarly to the previous illustration, a dispersion compensator whose transmission characteristic is optimized at intervals of 100 GHz, for example, (e.g., a dispersion compensator using a VIPA) may be adopted as the variable dispersion compensator 138. The amount of compensation for dispersion in the variable dispersion compensator 138 may be preset to an optimum value at starting the operation of the system, for example.

Figure 21:
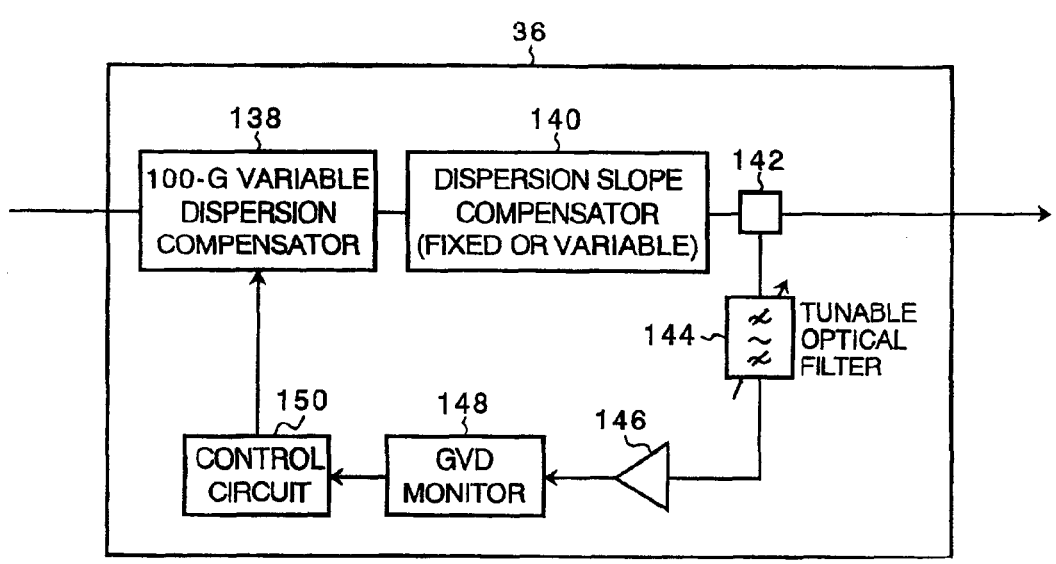
FIG. 21 is a block diagram showing a second preferred embodiment of the variable dispersion compensator applicable to the linear repeating unit.

FIG. 21 is a block diagram showing a second preferred embodiment of the dispersion compensator 36. In contrast to the preferred embodiment shown in FIG. 20, the preferred embodiment shown in FIG. 21 is intended to allow feedback control, and therefore further includes an optical coupler 142 for extracting monitor light from an output from the dispersion compensator 140, a tunable optical filter 144 for extracting an optical signal of an arbitrary channel from the monitor light, an optical amplifier 146 for amplifying an optical output from the filter 144, a dispersion monitor 148 for detecting chromatic dispersion according to an optical output from the optical amplifier 146, and a control circuit 150 for controlling the 100-G variable dispersion compensator 138 according to a detected value of the chromatic dispersion. With this configuration, the amount of compensation for dispersion in the variable dispersion compensator 138 can be feedback-controlled, thereby eliminating the need for presetting of the dispersion compensation amount.

Figure 22:
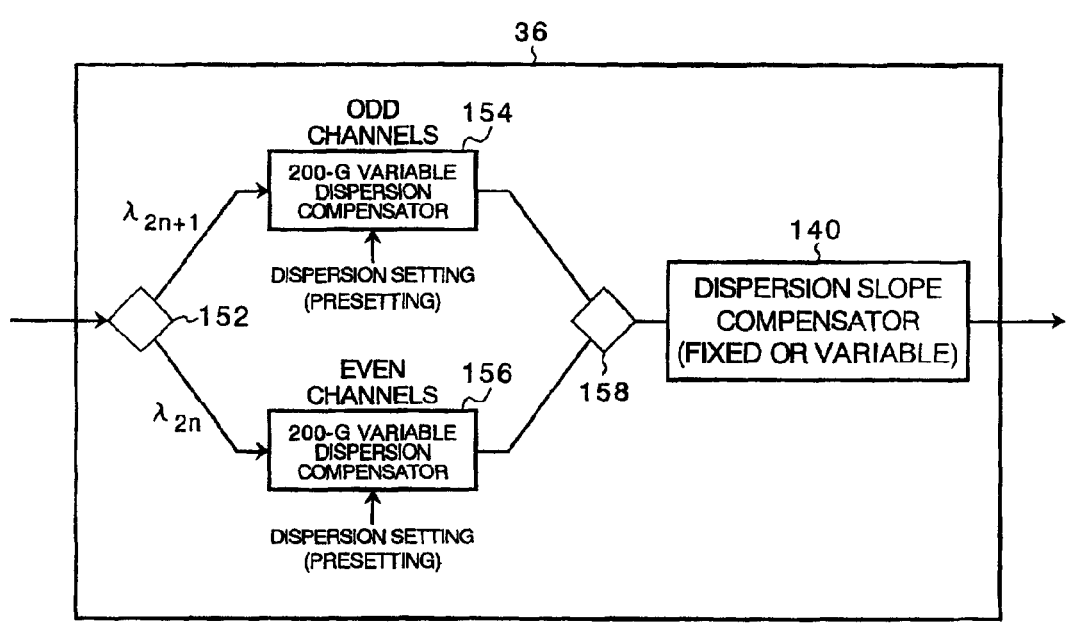
FIG. 22 is a block diagram showing a third preferred embodiment of the variable dispersion compensator applicable to the linear repeating unit.

FIG. 22 is a block diagram showing a third preferred embodiment of the dispersion compensator 36. In this preferred embodiment, the input WDM signal light is divided into a group of optical signals of odd channels and a group of optical signals of even channels by an interleaver 152 for increasing the channel spacing up to 200 GHz from 100 GHz. The group of optical signals of odd channels is passed through a 200-G variable dispersion compensator 154, whereas the group of optical signals of even channels is passed through a 200-G variable dispersion compensator 156. Outputs from the variable dispersion compensators 154 and 156 are combined again by an interleaver 158, and resultant WDM signal light is supplied to the dispersion slope compensator 140. The amounts of compensation for dispersion in the dispersion compensators 154 and 156 may be present to optimum values at starting the operation of the system.

With this configuration, the channel spacing is twice that in the preferred embodiment shown in FIG. 20, so that the band characteristics of the variable dispersion compensators 154 and 156 can be easily ensured.

Further, the interleaver may be further multi-staged (at intervals of 400 GHz, 800 GHz, and so on) to allow the use of a variable dispersion compensator increased in wavelength spacing.

Figure 23:
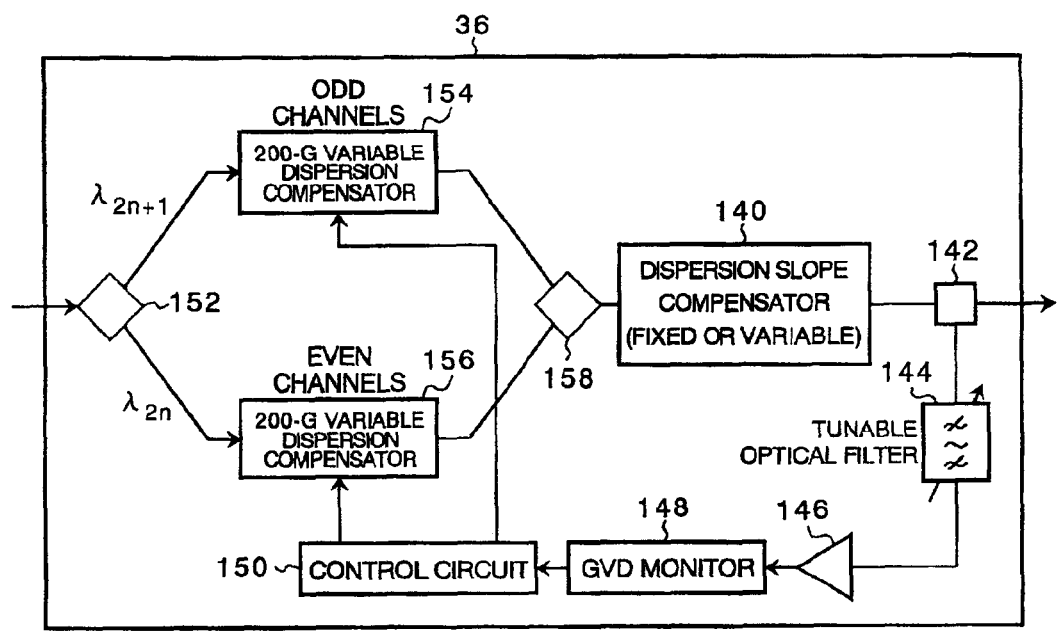
FIG. 23 is a block diagram showing a fourth preferred embodiment of the variable dispersion compensator applicable to the linear repeating unit.

FIG. 23 is a block diagram showing a fourth preferred embodiment of the dispersion compensator 36. In contrast to the preferred embodiment shown in FIG. 22, the preferred embodiment shown in FIG. 23 is intended to allow feedback control of the dispersion compensators 154 and 156, and therefore further includes an optical coupler 142 for extracting monitor light from an output from the dispersion slope compensator 140, a tunable optical filter 144 for extracting an optical signal having an arbitrary wavelength from the monitor light, an optical amplifier 146 for amplifying an optical output from the filter 144, a dispersion monitor 148 for detecting chromatic dispersion according to an optical output from the optical amplifier 146, and a control circuit 150 for controlling the 200-G variable dispersion compensators 154 and 156 according to an output from the dispersion monitor 148.

With this configuration, the amounts of compensation for dispersion in the dispersion compensators 154 and 156 can be feedback-controlled, thereby eliminating the need for presetting of the dispersion compensation amounts.

Figure 24:
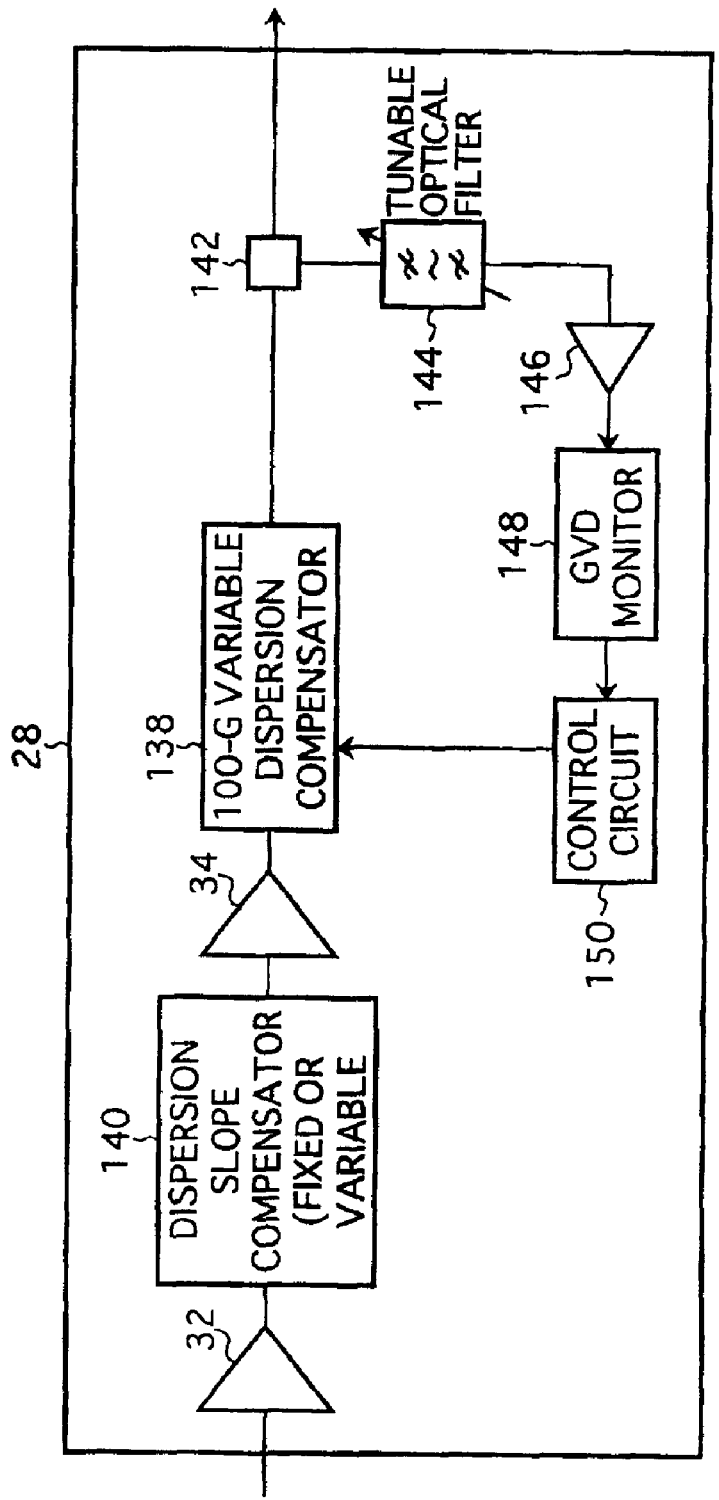
FIG. 24 is a block diagram showing a preferred embodiment of the linear repeating unit.

FIG. 24 is a block diagram showing a preferred embodiment of the linear repeating unit 28 shown in FIG. 4, for example. In this preferred embodiment, the internal configuration (arrangement or the like) of the linear repeating unit 28 shown in FIG. 4 is modified substantially in accordance with the preferred embodiment shown in FIG. 21.

The fixed or variable dispersion slope compensator 140 is inserted between the front-stage optical amplifier 32 and the rear-stage optical amplifier 34. The 100-G variable dispersion compensator 138 is connected to the output of the rear-stage optical amplifier 34. The dispersion compensation amount in the 100-G variable dispersion compensator 138 is feedback-controlled in accordance with the preferred embodiment shown in FIG. 21.

With this configuration, the losses by the dispersion slope compensator 140 and the variable dispersion compensator 138 can be dispersed to two or more positions, thereby relaxing the degradation in optical S/N ratio.

Figure 25:
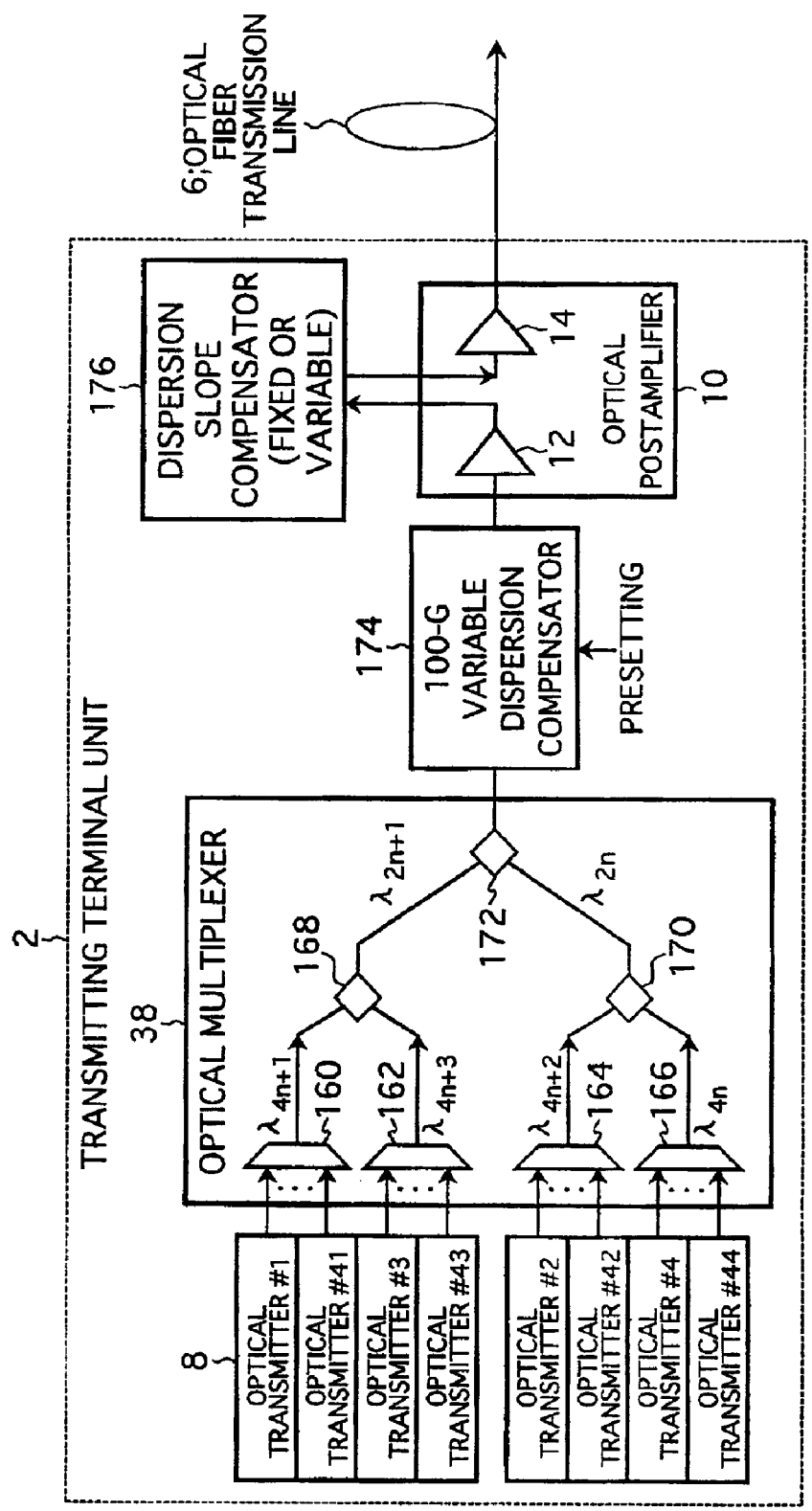
FIG. 25 is a block diagram showing a first preferred embodiment of the transmitting terminal unit.

FIG. 25 is a block diagram showing a first preferred embodiment of the transmitting terminal unit 2 shown in FIG. 4, for example. The optical multiplexer 38 has a configuration similar to that of the optical demultiplexer 44 shown in FIG. 6, for example. That is, the optical multiplexer 38 includes optical multiplexers 160, 162, 164, and 166 respectively corresponding to the optical demultiplexers 70, 72, 74, and 76, interleavers 168 and 170 respectively corresponding to the interleavers 66 and 68, and an interleaver 172 corresponding to the interleaver 64.

Optical signals output from optical transmitters 8(#1) to 8(#44) are wavelength division multiplexed by the optical multiplexer 38, and resultant WDM signal light is supplied through a 100-G variable dispersion compensator 174 to the optical postamplifier 10. A fixed or variable dispersion slope compensator 176 is inserted between the front-stage optical amplifier 12 and the rear-stage optical amplifier 14 of the optical postamplifier 10, and an output from the optical postamplifier 10 is supplied to the optical fiber transmission line 6.

In the case of obtaining the WDM signal light by wavelength division multiplexing optical signals each having a bit rate of 40 Gb/s at a channel spacing of 100 GHz, a dispersion compensator whose transmission characteristic is optimized at intervals of 100 GHz (e.g., a dispersion compensator using a VIPA) may be adopted as the variable dispersion compensator 174. The dispersion compensation amount in the variable dispersion compensator 174 may be present to an optimum value at starting the operation of the system.

Figure 26:
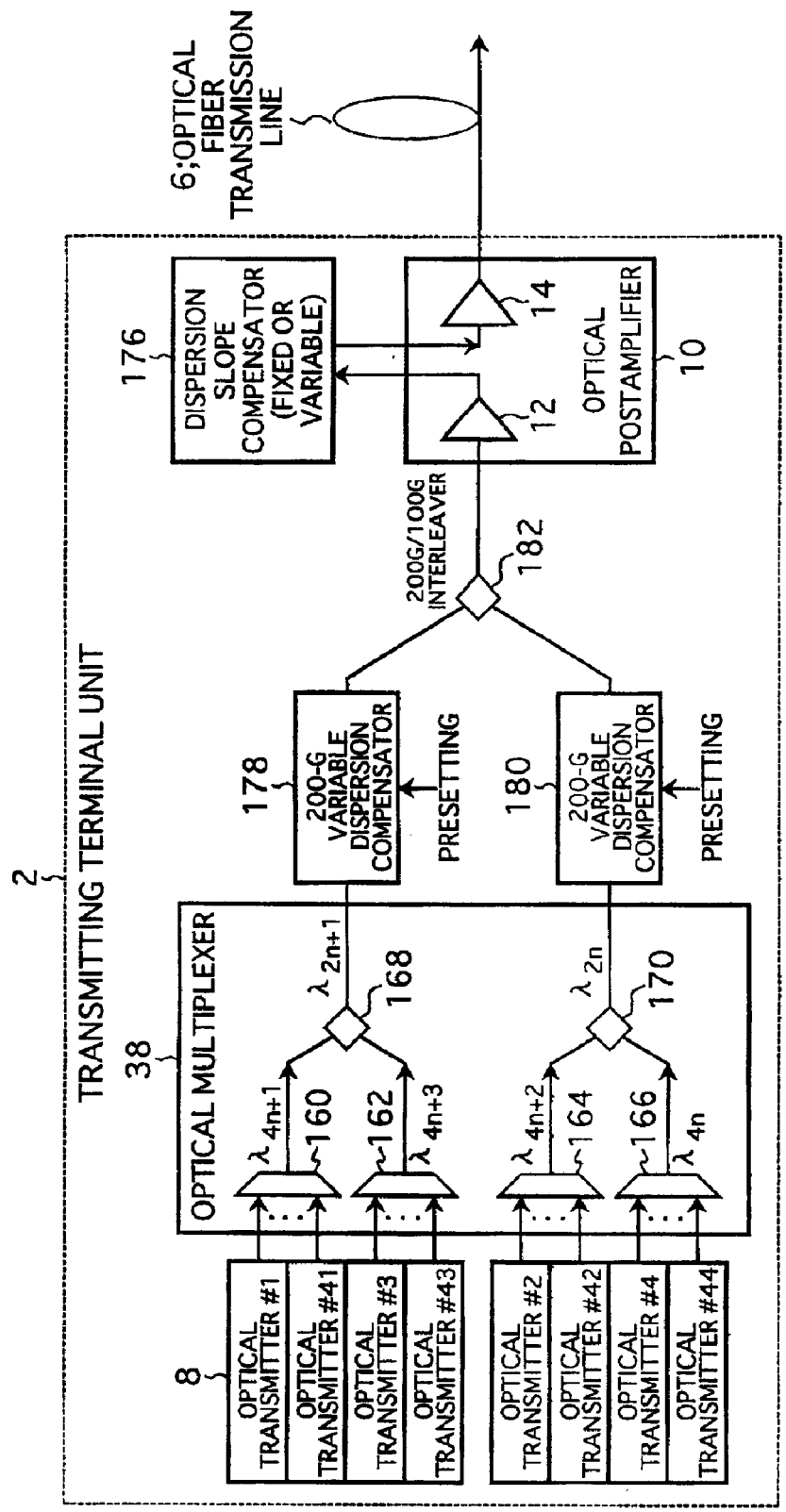
FIG. 26 is a block diagram showing a second preferred embodiment of the transmitting terminal unit.

FIG. 26 is a block diagram showing a second preferred embodiment of the transmitting terminal unit 2. In this preferred embodiment, the group of optical signals of add channels output from the interleaver 168 in the optical multiplexer 38 is passed through a 200-G variable dispersion compensator 178, and the group of optical signals of even channels output from the interleaver 170 in the optical multiplexer 38 is passed through a 200-G variable dispersion compensator 180. Outputs from the variable dispersion compensators 178 and 180 are combined by an interleaver 182 corresponding to the interleaver 172 (see FIG. 25), thus obtaining WDM signal light.

With this configuration, the channel spacing of the group of optical signals passing through each of the variable dispersion compensators 178 and 180 is twice that in the preferred embodiment shown in FIG. 25, so that the band characteristics of the variable dispersion compensators 178 and 180 can be easily ensured.

Further, the interleaver may be further multi-staged to allow the use of a variable dispersion compensator increased in wavelength spacing.

Figure 27:
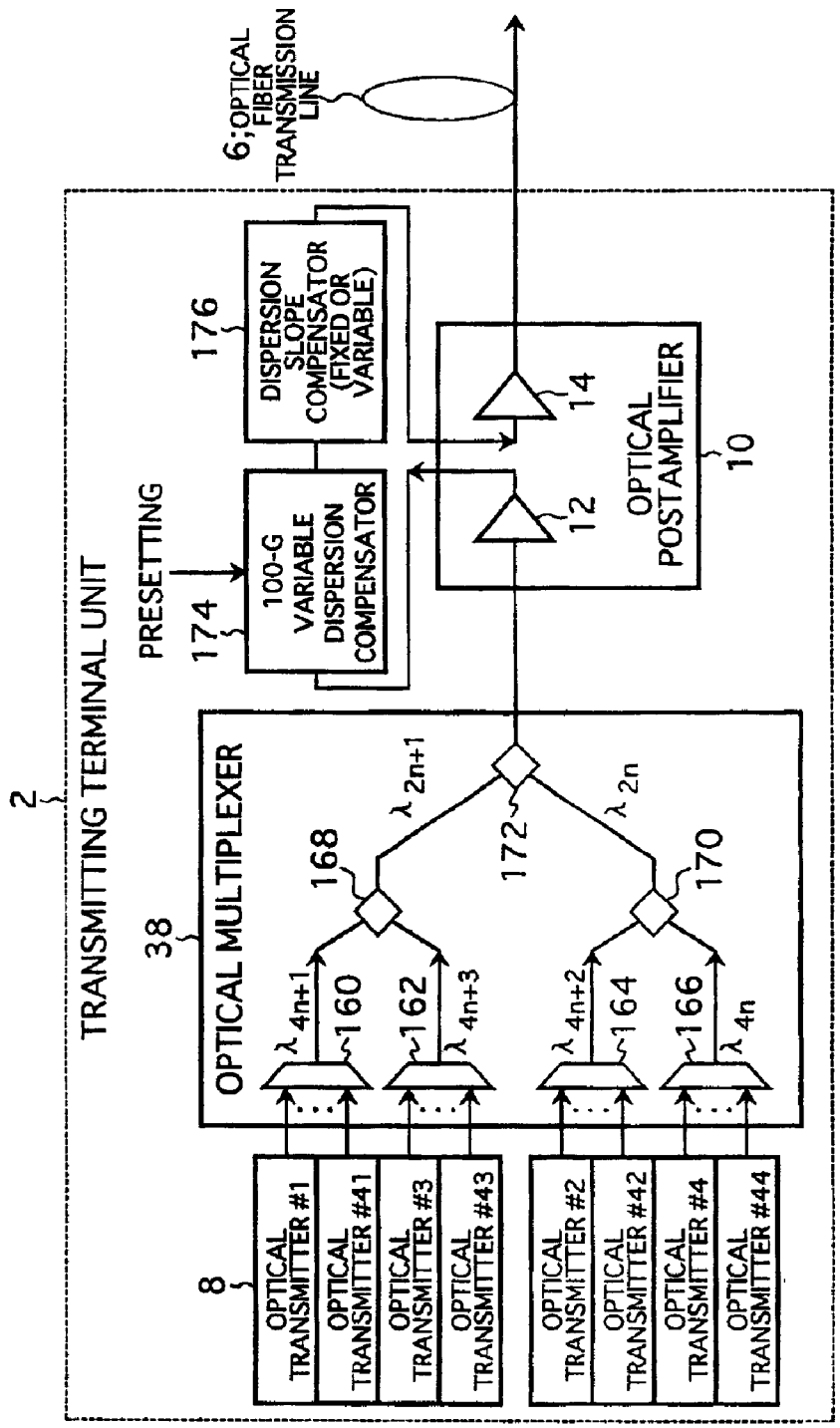
FIG. 27 is a block diagram showing a third preferred embodiment of the transmitting terminal unit.

FIG. 27 is a block diagram showing a third preferred embodiment of the transmitting terminal unit 2. In contrast to the preferred embodiment shown in FIG. 25, the preferred embodiment shown in FIG. 27 is characterized in that a 100-G variable dispersion compensator 174 and a variable dispersion slope compensator 176 connected in series are inserted between the front-stage optical amplifier 12 and the rear-stage optical amplifier 14 of the optical postamplifier 10. The dispersion compensation amount in the variable dispersion compensator 174 may be preset to an optimum value at starting the operation of the system.

Figure 28:
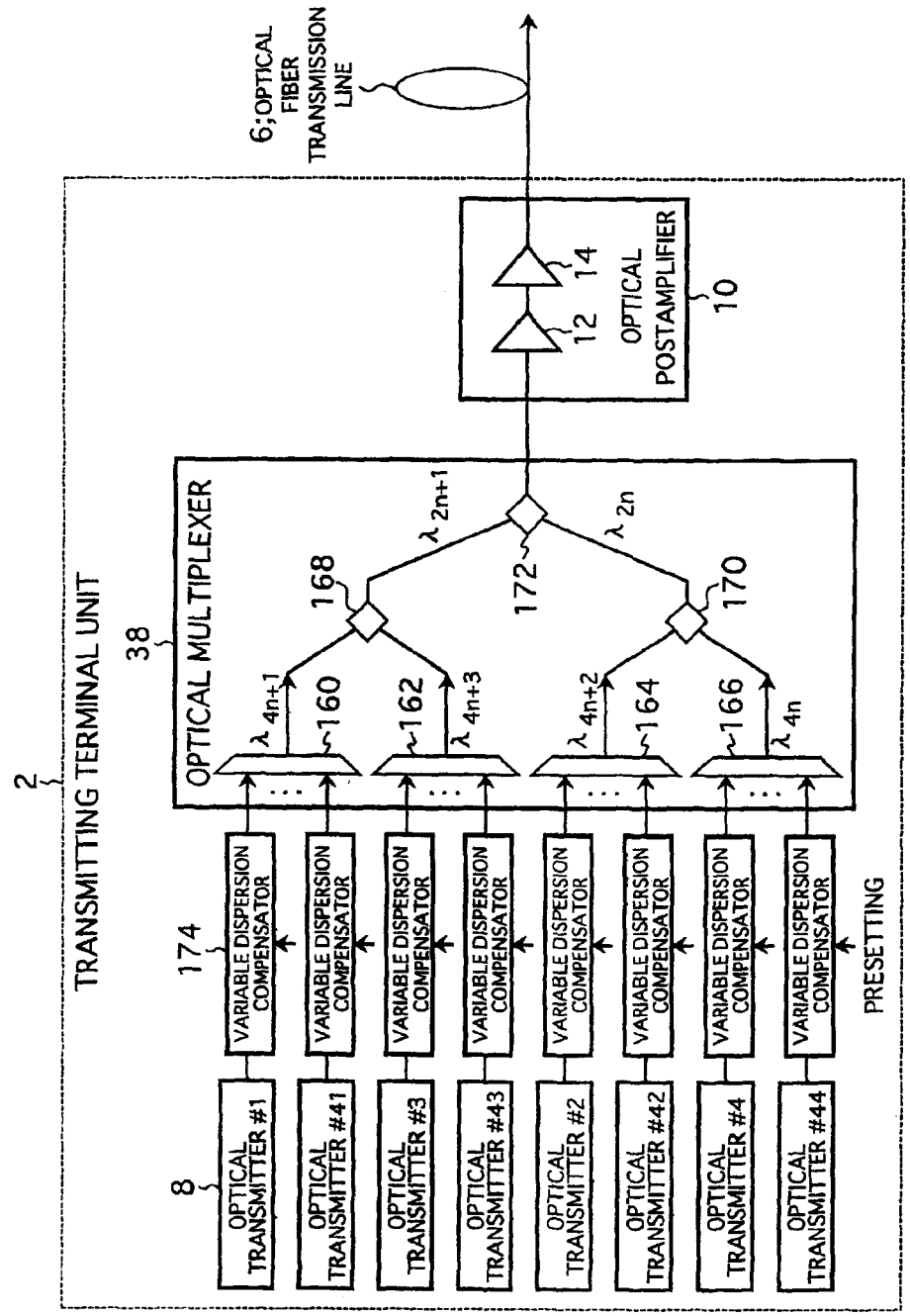
FIG. 28 is a block diagram showing a fourth preferred embodiment of the transmitting terminal unit.

FIG. 28 is a block diagram showing a fourth preferred embodiment of the transmitting terminal unit 2. In this preferred embodiment, a plurality of variable dispersion compensators 174 are respectively applied to the optical transmitters 8(#1) to 8(#44) to individually perform dispersion compensation of all the channels. Accordingly, no dispersion slope compensator is required. The dispersion compensation amount in each variable dispersion compensator 174 may be preset at starting the operation of the system.

Figure 29:
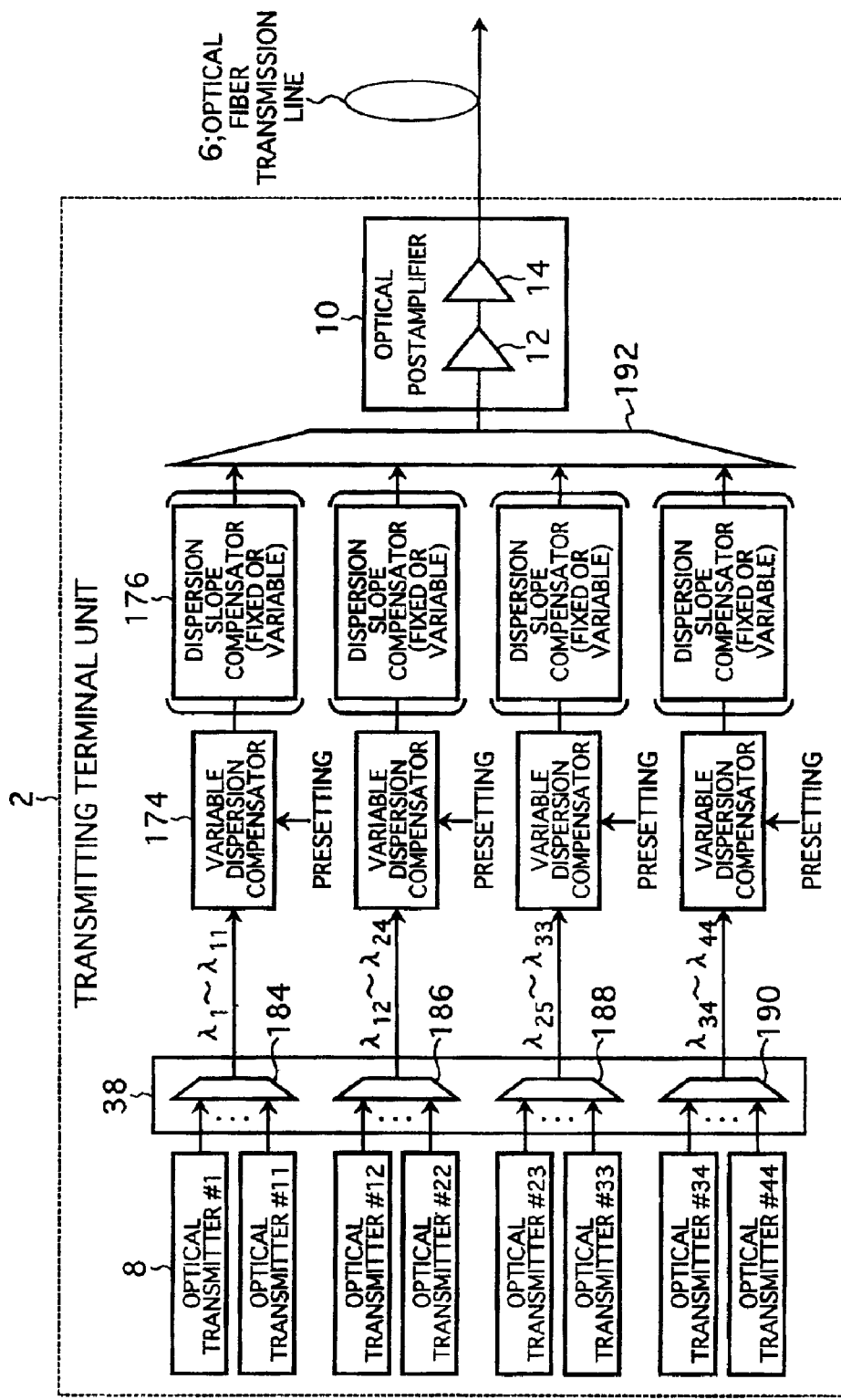
FIG. 29 is a block diagram showing a fifth preferred embodiment of the transmitting terminal unit.

FIG. 29 is a block diagram showing a fifth preferred embodiment of the transmitting terminal unit 2. In this preferred embodiment, the optical multiplexer 38 includes an optical multiplexer 184 connected to the optical transmitters 8(#1) to 8(#11) for obtaining a group of optical signals having wavelengths $\lambda_1$ to $\lambda_{11}$, an optical multiplexer 186 connected to the optical transmitters 8(#12) to 8(#22) for obtaining a group of optical signals having wavelengths $\lambda_{12}$ to $\lambda_{24}$, an optical multiplexer 188 connected to the optical transmitters 8(#23) to 8(#33) for obtaining a group of optical signals having wavelengths $\lambda_{25}$ to $\lambda_{33}$, and an optical multiplexer 190 connected to the optical transmitters 8(#34) to 8(#44) for obtaining a group of optical signals having wavelengths $\lambda_{34}$ to $\lambda_{44}$.

These four groups of optical signals are subjected to dispersion compensation by four variable dispersion compensators 174, respectively, and then passed through four fixed or variable dispersion slope compensators 176 as required. Thereafter, these four groups of optical signals are wavelength division multiplexed by a band multiplexing section 192, and resultant WDM signal light is amplified by the optical postamplifier 10. An output from the optical postamplifier 10 is supplied to the optical fiber transmission line 6.

Thus, the optical signals from the optical transmitters are grouped into a plurality of (four) bands according to the magnitude of wavelength, thereby relaxing the compensation characteristic required in each variable dispersion compensator 174. The dispersion compensation amount in each variable dispersion compensator 174 may be preset at starting the operation of the system.

Figure 30:
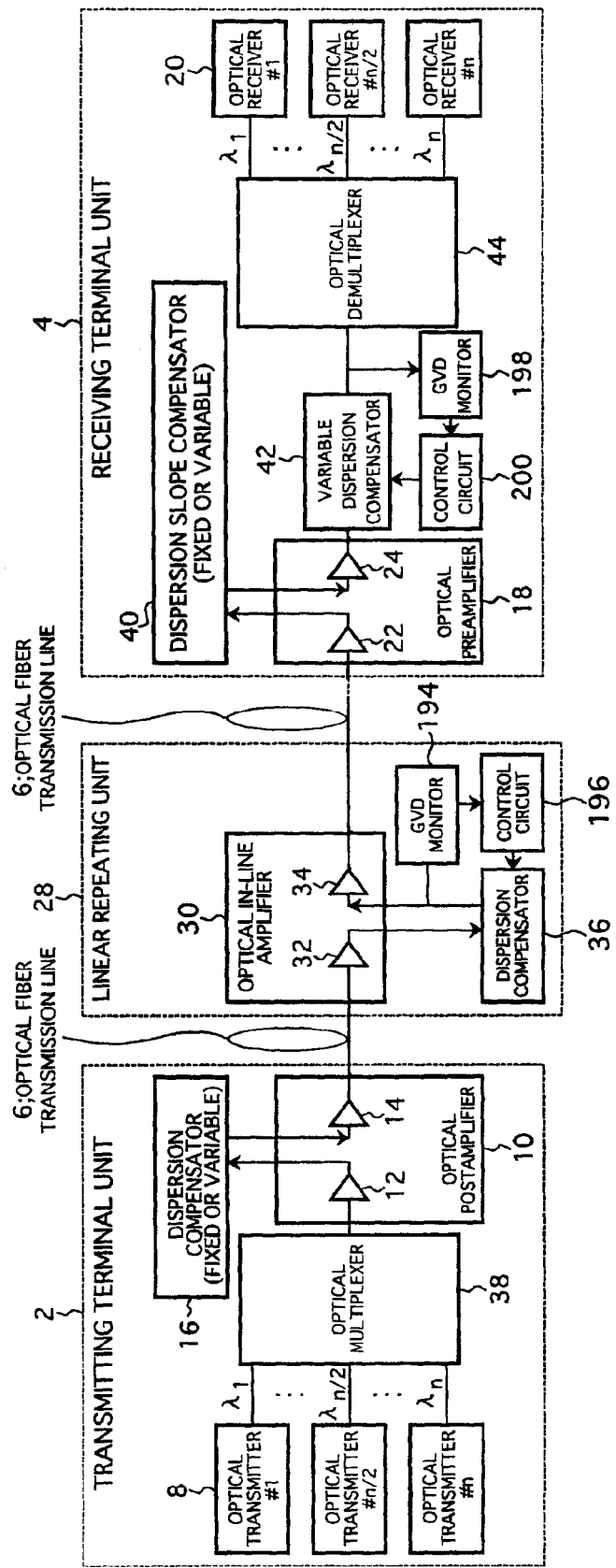
FIG. 30 is a block diagram for illustrating an example of the feedback control of chromatic dispersion in the system.

FIG. 30 is a block diagram for illustrating an example of the feedback control of dispersion compensation in the system shown in FIG. 4, for example. In the linear repeating unit 28, a dispersion monitor 194 monitors chromatic dispersion according to an output from the variable dispersion compensator 36, and a control circuit 196 controls the dispersion compensation amount in the variable dispersion compensator 36 according to the result of monitoring by the dispersion monitor 194. On the other hand, in the receiving terminal unit 4, a dispersion monitor 198 monitors chromatic dispersion according to an output from the variable dispersion compensator 42, and a control circuit 200 controls the dispersion compensation amount in the variable dispersion compensator 42 according to the result of monitoring by the dispersion monitor 198.

Thus, the dispersion compensation amounts in the linear repeating unit 28 and the receiving terminal unit 4 can be feedback-controlled independently.

Figure 31:
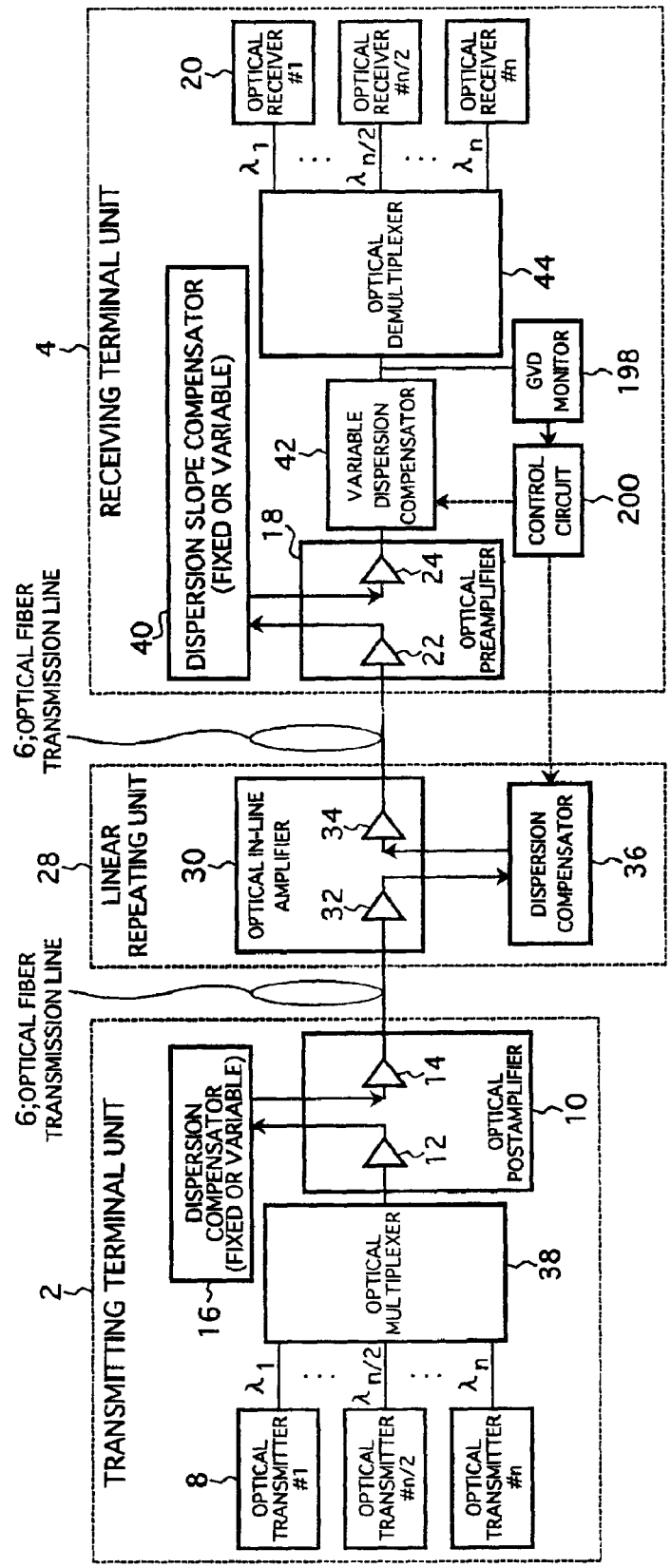
FIG. 31 is a block diagram for illustrating another example of the feedback control of chromatic dispersion in the system.

FIG. 31 is a block diagram for illustrating another example of the feedback control of dispersion compensation in the system shown in FIG. 4, for example. In this configuration, the dispersion compensation amount in the variable dispersion compensator 36 of the linear repeating unit 28 is controlled according to an output from the control circuit 200 of the receiving terminal unit 4. In the case that the optical fiber transmission line 6 is an up line, a down line may be used for transmission of control data from the control circuit 200 to the variable dispersion compensator 36. Thus, the dispersion compensation amounts in the linear repeating unit 28 and the receiving terminal unit 4 can be feedback-controlled simultaneously, thereby eliminating the need for the dispersion monitor 194 and the control circuit 196 shown in FIG. 30.

According to the present invention as described above, it is possible to provide a chromatic dispersion compensating method and system suitable for faster operation in a WDM transmission system.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method comprising:
  generating WDM signal light by wavelength division multiplexing a plurality of optical signals having different wavelengths;
  transmitting said WDM signal light by an optical fiber transmission line; and
  receiving said WDM signal light transmitted by said optical fiber transmission line;
  said receiving comprising:
    detecting chromatic dispersion related to at least two channels, and detecting dispersion slope based on said detected chromatic dispersion; and
    providing a variable dispersion compensator whose chromatic dispersion and dispersion slope are controlled based on said detected chromatic dispersion and said detected dispersion slope so that said detected chromatic dispersion is reduced.

2. A method according to claim 1, wherein said detecting comprises:
  converting at least one of said plurality of optical signals into an electrical signal; and detecting the power of a frequency component in said electrical signal corresponding to the bit rate of said at least one optical signal.

3. A method according to claim 1, wherein said transmitting comprises providing a linear repeating unit.

4. A method according to claim 3, wherein said transmitting further comprises:
  detecting chromatic dispersion related to at least one of said plurality of optical signals in said linear repeating unit; and
  providing a variable dispersion compensator whose chromatic dispersion and dispersion slope are controlled so that said detected chromatic dispersion in said linear repeating unit is reduced.

5. A method comprising:
  generating WDM signal light by wavelength division multiplexing a plurality of optical signals having different wavelengths;
  transmitting said WDM signal light by an optical fiber transmission line; and receiving said WDM signal light transmitted by said optical fiber transmission line;
  said receiving comprising:
    detecting chromatic dispersion related to at least one of said plurality of optical signals, and
    providing a variable dispersion compensator whose chromatic dispersion and dispersion slope are controlled so that said detected chromatic dispersion is reduced;
  wherein said transmitting comprises:
    providing a linear repeating unit,
    detecting chromatic dispersion related to at least one of said plurality of optical signals in said linear repeating unit,
    providing a variable dispersion compensator whose chromatic dispersion is controlled so that said detected chromatic dispersion in said linear repeating unit is reduced, and
    providing a dispersion slope compensator for compensating dispersion slope in said linear repeating unit.

6. A method comprising:
  generating WDM signal light by wavelength division multiplexing a plurality of optical signals having different wavelengths;
  transmitting said WDM signal light by an optical fiber transmission line; and
  receiving said WDM signal light transmitted by said optical fiber transmission line;
  said receiving comprising:
    detecting chromatic dispersion related to at least one of said plurality of optical signals, and
    providing a variable dispersion compensator whose chromatic dispersion and dispersion slope are controlled so that said detected chromatic dispersion is reduced,
  wherein said generating comprises:
    detecting chromatic dispersion related to at least one of said plurality of optical signals,
    providing a variable dispersion compensator whose chromatic dispersion is controlled so that said detected chromatic dispersion is reduced, and
    providing a dispersion slope compensator for compensating dispersion slope.

7. A method comprising:
  generating WDM signal light by wavelength division multiplexing a plurality of optical signals having different wavelengths;
  transmitting said WDM signal light by an optical fiber transmission line; and
  receiving said WDM signal light transmitted by said optical fiber transmission line;
  said receiving step comprising:
    detecting chromatic dispersion related to at least two channels, and detecting dispersion slope based on said detected chromatic dispersion,
    providing a variable dispersion compensator whose chromatic dispersion is controlled based on said detected chromatic dispersion so that said detected chromatic dispersion is reduced, and
    providing a dispersion slope compensator for compensating dispersion slope based on said detected dispersion slope.

8. A method according to claim 7, wherein said detecting comprises:
  converting at least one of said plurality of optical signals into an electrical signal; and
  detecting the power of a frequency component in said electrical signal corresponding to the bit rate of said at least one optical signal.

9. A method according to claim 7, wherein said transmitting comprises providing a linear repeating unit.

10. A method comprising:
  generating WDM signal light by wavelength division multiplexing a plurality of optical signals having different wavelengths;
  transmitting said WDM signal light by an optical fiber transmission line; and
  receiving said WDM signal light transmitted by said optical fiber transmission line;
  said receiving comprising:
    detecting chromatic dispersion related to at least one of said plurality of optical signals, providing a variable dispersion compensator whose chromatic dispersion is controlled so that said detected chromatic dispersion is reduced, and providing a dispersion slope compensator for compensating dispersion slope, wherein said transmitting comprises:

providing a linear repeating unit detecting chromatic dispersion related to at least one of said plurality of optical signals in said linear repeating unit; and providing a variable dispersion compensator whose chromatic dispersion and dispersion slope are controlled so that said detected chromatic dispersion in said linear repeating unit is reduced.

11. A method comprising:

generating WDM signal light by wavelength division multiplexing a plurality of optical signals having different wavelengths;

transmitting said WDM signal light by an optical fiber transmission line; and receiving said WDM signal light transmitted by said optical fiber transmission line;

said receiving comprising:

detecting chromatic dispersion related to at least one of said plurality of optical signals, providing a variable dispersion compensator whose chromatic dispersion is controlled so that said detected chromatic dispersion is reduced, and providing a dispersion slope compensator for compensating dispersion slope, wherein said transmitting comprises:

detecting chromatic dispersion related to at least one of said plurality of optical signals in said linear repeating unit;

providing a variable dispersion compensator whose chromatic dispersion is controlled so that said detected chromatic dispersion in said linear repeating unit is reduced; and providing a dispersion slope compensator for compensating dispersion slope in said linear repeating unit.

12. A method comprising:

generating WDM signal light by wavelength division multiplexing a plurality of optical signals having different wavelengths;

transmitting said WDM signal light by an optical fiber transmission line; and receiving said WDM signal light transmitted by said optical fiber transmission line;

said receiving comprising:

detecting chromatic dispersion related to at least one of said plurality of optical signals;

providing a variable dispersion compensator whose chromatic dispersion is controlled so that said detected chromatic dispersion is reduced; and providing a dispersion slope compensator for compensating dispersion slope, wherein said generating comprises:

detecting chromatic dispersion related to at least one of said plurality of optical signals;

providing a variable dispersion compensator whose chromatic dispersion is controlled so that said detected chromatic dispersion is reduced; and providing a dispersion slope compensator for compensating dispersion slope.

13. A system comprising:

a transmitting terminal unit for generating WDM signal light by wavelength division multiplexing a plurality of optical signals having different wavelengths;

an optical fiber transmission line for transmitting said WDM signal light; and a receiving terminal unit for receiving said WDM signal light transmitted by said optical fiber transmission line;

said receiving terminal unit comprising:

a dispersion monitor for detecting chromatic dispersion related to at least two channels, and detecting dispersion slope based on said detected chromatic dispersion;

a variable dispersion compensator; and a circuit for controlling the chromatic dispersion and dispersion slope in said variable dispersion compensator based on said detected chromatic dispersion and said detected dispersion slope so that said detected chromatic dispersion is reduced.

14. A system according to claim 13, wherein said dispersion monitor comprises a converter for converting at least one of said plurality of optical signals into an electrical signal, a bandpass filter for extracting a frequency component in said electrical signal corresponding to the bit rate of said at least one optical signal, and a power sensor for detecting the power of said frequency component.

15. A system according to claim 13, wherein said receiving terminal unit comprises an interleaver for dividing said WDM signal into first group of optical signals and second group of optical signals, said variable dispersion compensators is provided for said first group and second group; and said circuit controls said variable dispersion compensators provided for the first group and the second group.

16. A system according to claim 13, wherein said transmitting terminal unit comprises an interleaver for dividing said a plurality of optical signals into first group of optical signals and second group of optical signals; first variable dispersion compensator for compensating chromatic dispersion for optical signals of said first group; and second variable dispersion compensator for compensating chromatic dispersion for optical signals of said second group.

17. A system comprising:

a transmitting terminal unit for generating WDM signal light by wavelength division multiplexing a plurality of optical signals having different wavelengths;

an optical fiber transmission line for transmitting said WDM signal light; and a receiving terminal unit for receiving said WDM signal light transmitted by said optical fiber transmission line;

said receiving terminal unit comprising:

a dispersion monitor for detecting chromatic dispersion related to at least two channels, and detecting dispersion slope based on said detected chromatic dispersion;

a variable dispersion compensator;

a circuit for controlling the chromatic dispersion in said variable dispersion compensator based on said detected chromatic dispersion so that said detected chromatic dispersion is reduced; and a dispersion slope compensator for compensating dispersion slope based on said detected dispersion slope.

18. A system according to claim 17, wherein said dispersion monitor comprises a converter for converting at least one of said plurality of optical signals into an electrical signal, a bandpass filter for extracting a frequency component in said electrical signal corresponding to the bit rate of said at least one optical signal, and a power sensor for detecting the power of said frequency component.

19. A system according to claim 17, wherein said receiving terminal unit comprises a polarization mode dispersion compensator provided for said each optical signal.

20. A method comprising:
generating WDM signal light by wavelength division multiplexing a plurality of optical signals having different wavelengths;
transmitting said WDM signal light by an optical fiber transmission line; and
receiving said WDM signal light transmitted by said optical fiber transmission line;
said receiving comprising:
detecting chromatic dispersion related to at least one of said plurality of optical signals during an operation of a system,
providing a variable dispersion compensator whose chromatic dispersion is controlled adaptively based on said detected chromatic dispersion during said operation of said system so that said detected chromatic dispersion is reduced, and
providing a dispersion slope compensator for compensating dispersion slope.

21. A system comprising:
a transmitting terminal unit for generating WDM signal light by wavelength division multiplexing a plurality of optical signals having different wavelengths;
an optical fiber transmission line for transmitting said WDM signal light; and
a receiving terminal unit for receiving said WDM signal light transmitted by said optical fiber transmission line;
said receiving terminal unit comprising:
a dispersion monitor for detecting chromatic dispersion related to at least one of said plurality of optical signals during an operation of a system;
a variable dispersion compensator;
a circuit for controlling the chromatic dispersion in said dispersion compensator adaptively during said operation of said system based on said detected chromatic dispersion so that said detected chromatic dispersion is reduced; and
a dispersion slope compensator for compensating dispersion slope.

* * * * *

UNITED STATES PATENT AND TRADEMARK OFFICE
CERTIFICATE OF CORRECTION

PATENT NO. : 6,925,262 B2
DATED : August 2, 2005
INVENTOR(S) : Ooi et al.

It is certified that error appears in the above-identified patent and that said Letters Patent is hereby corrected as shown below:

<u>Title page,</u>
Item [56], References Cited, U.S. PATENT DOCUMENTS,
change "Danziger" to -- Danziger et al. --.

<u>Column 18,</u>
Lines 33 and 35-36, change "compensators" to -- compensator --.

Signed and Sealed this

Eighteenth Day of April, 2006

JON W. DUDAS
*Director of the United States Patent and Trademark Office*